United States Patent
Clement et al.

(10) Patent No.: US 10,642,991 B2
(45) Date of Patent: *May 5, 2020

(54) SYSTEM LEVEL VIRTUAL REALITY PRIVACY SETTINGS

(71) Applicant: GOOGLE INC., Mountain View, CA (US)

(72) Inventors: Manuel Christian Clement, Felton, CA (US); Stefan Welker, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/717,885

(22) Filed: Sep. 27, 2017

(65) Prior Publication Data
US 2018/0107835 A1 Apr. 19, 2018

Related U.S. Application Data

(60) Provisional application No. 62/408,248, filed on Oct. 14, 2016.

(51) Int. Cl.
*G06F 17/00* (2019.01)
*G06F 21/62* (2013.01)
(Continued)

(52) U.S. Cl.
CPC ........ *G06F 21/6218* (2013.01); *A63F 13/211* (2014.09); *A63F 13/212* (2014.09);
(Continued)

(58) Field of Classification Search
CPC ............. G06F 21/6218; G06F 3/04847; A63F 13/211; A63F 13/212; A63F 13/5255; A63F 13/35; A63F 13/71
(Continued)

(56) References Cited

U.S. PATENT DOCUMENTS 10,115,141 B1 * 10/2018 Warman ............ G06Q 30/0615
10,228,893 B2 * 3/2019 Todasco ................ G06F 3/1454
(Continued)

FOREIGN PATENT DOCUMENTS

WO 2008130842 A1 10/2008

OTHER PUBLICATIONS

Szalavari et al., Collaborative Gaming in Augmented Reality, Google Scholar 1998, pp. 1-19. (Year: 1998).*
(Continued)

*Primary Examiner* — Cong-Lac Huynh
(74) *Attorney, Agent, or Firm* — Brake Hughes Bellermann LLP

(57) ABSTRACT

Computer-implemented systems and methods are described for configuring a plurality of privacy properties for a plurality of virtual objects associated with a first user and a virtual environment being accessed using a device associated with the first user, triggering for display, in the virtual environment, the plurality of virtual objects to the first user accessing the virtual environment, determining whether at least one virtual object is associated with a privacy setting corresponding to the first user. In response to determining that a second user is attempting to access the one virtual object, a visual modification may be applied to the object based on a privacy setting. The method may also include triggering for display, the visual modification of the at least one virtual object, to the second user while continuing to trigger display of the at least one virtual object without the visual modification to the first user.

20 Claims, 11 Drawing Sheets

(51) Int. Cl.
| | |
|---|---|
| *G06F 3/0484* | (2013.01) |
| *G06F 3/01* | (2006.01) |
| *A63F 13/5255* | (2014.01) |
| *A63F 13/71* | (2014.01) |
| *A63F 13/211* | (2014.01) |
| *A63F 13/35* | (2014.01) |
| *A63F 13/25* | (2014.01) |
| *A63F 13/212* | (2014.01) |
| *A63F 13/75* | (2014.01) |
| *G07F 17/32* | (2006.01) |
| *G06F 3/0481* | (2013.01) |
| *A63F 13/73* | (2014.01) |

(52) U.S. Cl.
CPC .............. *A63F 13/25* (2014.09); *A63F 13/35* (2014.09); *A63F 13/5255* (2014.09); *A63F 13/71* (2014.09); *A63F 13/75* (2014.09); *G06F 3/011* (2013.01); *G06F 3/04847* (2013.01); *G06F 21/6209* (2013.01); *G07F 17/3211* (2013.01); *G07F 17/3241* (2013.01); *A63F 13/73* (2014.09); *G06F 3/017* (2013.01); *G06F 3/04817* (2013.01); *G06F 3/04842* (2013.01)

(58) Field of Classification Search
USPC ........................................................ 715/757
See application file for complete search history.

(56) References Cited

U.S. PATENT DOCUMENTS

| | | | | |
|---|---|---|---|---|
| 2008/0229184 A1* | 9/2008 | Prish | .................... | G06F 17/246 715/212 |
| 2008/0262911 A1* | 10/2008 | Altberg | .................. | G06Q 30/02 705/14.73 |
| 2009/0089685 A1 | 4/2009 | Mordecai et al. | | |
| 2009/0119604 A1 | 5/2009 | Simard et al. | | |
| 2009/0172539 A1 | 7/2009 | Bates et al. | | |
| 2009/0282472 A1 | 11/2009 | Hamilton et al. | | |
| 2010/0121773 A1* | 5/2010 | Currier | ................. | G06F 21/577 705/347 |
| 2010/0125799 A1* | 5/2010 | Roberts | ................... | G06F 3/011 715/757 |
| 2010/0162149 A1 | 6/2010 | Sheleheda et al. | | |
| 2010/0273457 A1 | 10/2010 | Freeman et al. | | |
| 2011/0055733 A1* | 3/2011 | Hamilton, II | ........... | A63F 13/79 715/757 |
| 2011/0066860 A1 | 3/2011 | Dettinger et al. | | |
| 2012/0050325 A1* | 3/2012 | Joo | ......................... | A63F 13/65 345/633 |
| 2013/0198657 A1 | 8/2013 | Jones et al. | | |
| 2013/0304817 A1* | 11/2013 | Hu | .................... | H04N 21/41407 709/204 |
| 2014/0090091 A1* | 3/2014 | Prakash | .............. | G06F 21/6245 726/30 |
| 2014/0173747 A1* | 6/2014 | Govindaraju | ........... | G06F 21/53 726/27 |
| 2014/0176604 A1* | 6/2014 | Venkitaraman | ........ | G09G 5/377 345/633 |
| 2014/0368537 A1* | 12/2014 | Salter | .................... | G06T 19/006 345/633 |
| 2015/0029223 A1* | 1/2015 | Kaino | ................... | G06T 19/006 345/633 |
| 2015/0172242 A1* | 6/2015 | Goncalves | ............ | H04L 51/063 709/206 |
| 2015/0356787 A1 | 12/2015 | Homma et al. | | |
| 2016/0055343 A1* | 2/2016 | Coard | ..................... | G06F 21/31 726/7 |
| 2016/0225189 A1 | 8/2016 | Nishizawa | | |
| 2016/0321841 A1* | 11/2016 | Christen | ............... | G06T 19/006 |
| 2017/0048245 A1* | 2/2017 | Owen | ................. | G06F 21/6227 |
| 2017/0052676 A1* | 2/2017 | Pulier | ................. | G06F 3/04817 |
| 2017/0232348 A1* | 8/2017 | Williams | .............. | A63F 13/235 463/31 |
| 2018/0107839 A1* | 4/2018 | Clement | ............. | G06F 21/6245 |
| 2018/0121069 A1* | 5/2018 | DiVerdi | ............. | G06F 3/04847 |
| 2018/0157333 A1* | 6/2018 | Ross | .................. | G06F 21/6245 |
| 2018/0165473 A1* | 6/2018 | Debickes | ............. | H04L 63/105 |
| 2018/0350144 A1* | 12/2018 | Rathod | ................. | H04W 4/029 |

OTHER PUBLICATIONS

Magekurth et al., Augmenting the Virtual Domain with Physical and Social Elements, ACM 2004, pp. 163-172. (Year: 2004).*
Xu et al., Privacy-Enhancing Personalized Web Search, ACM 2007, pp. 591-600. (Year: 2007).*
International Search Report and Written Opinion for International Application No. PCT/US2017/053995, dated Nov. 17, 2017, 11 pages.

* cited by examiner

SYSTEM LEVEL VIRTUAL REALITY PRIVACY SETTINGS

CROSS REFERENCE TO RELATED APPLICATION

This application claims priority to U.S. Provisional Application No. 62/408,248, filed on Oct. 14, 2016, entitled "SYSTEM LEVEL VIRTUAL REALITY PRIVACY SETTINGS", the disclosure of which is incorporated herein by reference.

TECHNICAL FIELD

This description generally relates to maintaining privacy for information used in virtual reality (VR) environments.

BACKGROUND

Virtual reality environments that allow multiple users to interact may provide for any number of interaction methods. While interacting in a multi-user VR space, user actions and inputs may be viewed by other users in the VR space. In addition, tracking mechanisms can capture and record user actions and input with cameras and sensors. Such an environment, however, may not provide for exchange of information in a desirable fashion.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described that includes configuring, with a processor, a plurality of privacy properties for a plurality of virtual objects associated with a first user accessing a virtual environment using a device associated with the first user, triggering for display, in the virtual environment, at least one of the plurality of virtual objects to the first user accessing the virtual environment, and determining whether the at least one virtual object is associated with a privacy setting corresponding to the first user. In response to determining that a second user is attempting to access the at least one virtual object, the method may also include applying a visual modification to the at least one virtual object based at least in part on a privacy setting associated with the at least one virtual object and triggering for display, in the virtual environment, the visual modification of the at least one virtual object to the second user while continuing to trigger display, to the first user, the at least one virtual object without the visual modification.

Implementations may include one or more of the following features. The method may further include having the visual modification apply to a portion of the at least one virtual object. The modification may include modifying display of the at least one virtual object for the second user by randomizing pixels depicting motions associated with the portion. Implementations of the described techniques may include hardware, a method or process, or computer software on a computer-accessible medium.

In some implementations, the method may include triggering for display, on the at least one virtual object, an icon in which to select a privacy mode, receiving, from the user, a selection on the icon, triggering hiding of the at least one virtual object from display to users other than the first user, if the selection represents a private privacy mode, and triggering revealing of the at least one virtual object in the virtual environment to at least a portion of users accessing the virtual environment, if the selection represents a public privacy mode. Implementations of the described techniques may include hardware, a method or process, or computer software on a computer-accessible medium.

In some implementations, the method may further include determining, for the first user, a context of use for at least one of the plurality of virtual objects in the virtual environment, and triggering for display, in the virtual environment, the at least one virtual object to the first user. In response to determining the second user is accessing the virtual environment, applying a visual modification to the at least one virtual object based at least in part on the context of use associated with the at least one virtual object, and triggering for display the visual modification of the at least one virtual object to at least a portion of the additional users until determining that the context of use is a public use associated with the at least one virtual object. Implementations of the described techniques may include hardware, a method or process, or computer software on a computer-accessible medium.

In some implementations, the method may further include detecting an input associated with the at least one virtual object, determining that the input is associated with data corresponding to the at least one virtual object and a privacy setting, determining that the user is entering additional input corresponding to the at least one virtual object, and changing the privacy setting associated with the at least one virtual object from public to private in response to determining that the additional input includes personal data. Implementations of the described techniques may include hardware, a method or process, or computer software on a computer-accessible medium.

In some implementations, changing a privacy setting associated with the at least one virtual object from public to private includes modifying for the second user, a view of the at least one virtual object including the input, the personal data, and the additional input. In some implementations, modifying the view of the at least one virtual object includes scrambling pixels associated with the input when displaying the input to the second user. Implementations of the described techniques may include hardware, a method or process, or computer software on a computer-accessible medium.

In some implementations, the method may further include determining that the input includes a first gesture, performed by the first user, the first gesture including holding a computing device with a display screen facing the first user, and determining that the additional input includes a second gesture, performed by the first user, the second gesture including holding the computing device facing away from the first user so as to indicate screen content is available for viewing by the second user. In response to detecting the second gesture, the method may include changing a privacy setting associated with the computing device from private to public and displaying the screen content, in the virtual environment, to the second user accessing the virtual environment. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
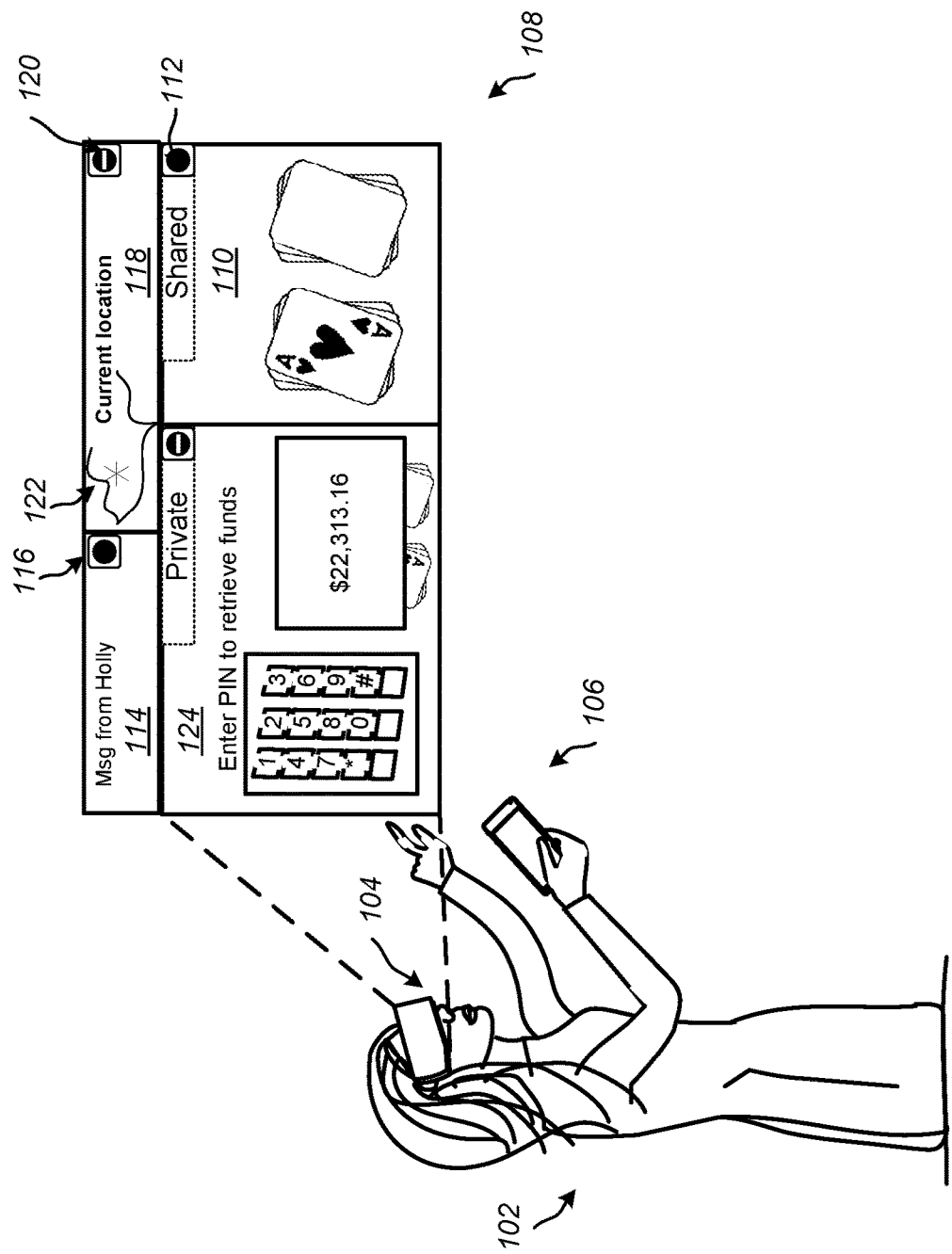
FIG. 1 is a diagram depicting an example of a user interacting while in a virtual reality (VR) space.

Providing and maintaining privacy mechanisms in a virtual reality environment (e.g., a VR space) can include modifying VR content to maintain private information for users in the VR space. In some implementations, the systems and methods described herein can provide a way for users to share particular portions of information with other users in a same VR space while maintaining data and user privacy for other portions of information and/or VR content. The data privacy mechanisms described herein can ensure that user-entered data, user-interfaced data, and stored data remain private to particular users. The user privacy mechanisms described herein can ensure that user gestures and interactions remain private to particular users. The data privacy and user privacy can be revoked by a user or automatically revoked by the VR systems operating on a set of pre-configured privacy rules. Revoking privacy may result in publicizing data or user interactions in the VR space to users operating in the same VR space.

Input privacy can be provided for any number of information exchange mechanisms including, but not limited to keyboard input, laser pointer input, musical instrument input, controller input, virtual and web content viewing and selection by mouse, finger, or stylus input, user actions, motions, or gestures, user audio interaction or other interactions with VR objects and content in the VR space. Such input can be modified, obfuscated, or removed by hiding or modifying images of users or VR objects provided to other users in a multi-user VR space. The modifications may include removing content, scrambling and/or randomizing pixels and motions, modifying display of movements as other users see the movements, muting audio, blurring users or content, and/or translating movements to indicate other movements, etc. In general, a user providing input can view her input as the input is provided and in the manner that the input is provided. The systems described herein can privatize the input rather than display the input for other users accessing the same VR space.

The privacy mechanisms described throughout this disclosure can provide privacy for users in multi-user sessions in a VR space. The privacy can be arranged for user data and input gesture data using privacy settings configured by users, VR directors, VR software developers, and/or devices used in the VR space.

In some implementations, the systems and methods described herein can provide privacy settings and options at the system level based on a context for the user, devices, and/or virtual objects in the VR space. In addition, the systems and methods described herein can provide privacy settings and options at the system level based on predictions carried out for scenarios taking place in the VR space. In general, users can be provided privacy settings and/or triggers to privatize or publicize VR objects, actions, textual input, audio input, and/or other input based on the system determining a user context and/or predicting upcoming actions or events. In one example, if the VR systems described herein determine that a user has a scheduled meeting (e.g., a calendar scheduled personal meeting outside of the office), the VR system can privatize such information to block other users from viewing such content while in the VR space.

In some implementations, the systems described herein can perform context of use analysis on users, devices, and/or virtual objects in a particular VR space. The context of use may refer to one or more conditions under which a particular virtual object is being used (or predictively used) by a user in the VR space. The analysis may include collecting and analyzing detailed information about users, user tasks, content accessed on computing devices associated with the VR space, a physical environment of the user, constraints of the VR space, or other contextual factors affecting user experience in the VR space. Example data used to determine a context of use can include, user-entered data, user-tracked data, data captured about the user, user gestures, virtual object attributes, VR space attributes, social networking activity, online activity, and/or currently engaged activities, applications, and/or privacy settings.

In one example, the user may be accessing virtual content in a VR space and may wish to enter private information. The private information may be a personal identification number (PIN), for example, in which the user can use in the VR space to access financial information. If the user enters the PIN as input in a VR space without privacy settings configured, the input, gestures, motions, and/or content associated with the input can be viewed by other users in the same VR space. In addition, the user input may be recorded by other users by virtue of networked tracking cameras, system defaults, or surreptitious users that wish to gain access to private content by recording and analyzing such content. In some implementations, users may simply watch an input in real time and gain access to private content if privacy settings are not configured for the user and/or the objects and/or content in the VR space.

In another example, the user may be in a multi-user game and may be typing messages to one or more players. If the user wishes to hide VR content, such as typing motions or behavior because she prefers to have messages viewed by certain users rather than all users, the systems and methods described herein can enable the user to set particular privacy settings to enable privately communicating while hiding the communication-based VR content and any motions or gestures associated with the communication. Hiding such VR content can include, scrambling displayed content (e.g., blurring, randomizing, and/or scrambling pixels in the displayed content) or input, freezing VR objects or input display, halting transmission of communications with particular users, and/or obfuscating or blocking VR objects or input, just to name a few examples.

Referring to FIG. 1, a user 102 is wearing a head-mounted display (HMD) device 104 and holding a portable electronic device 106. The portable electronic device 106 may be, for example, a computing device such as a controller, or a mobile device (e.g., a smartphone, a tablet, a joystick, or other portable controller(s)) that may be paired with, or communicate with, the HMD device 104 for interaction in the VR space 108. The VR space 108 is a representation of an environment that may be generated by the HMD device 104 (and/or other virtual reality hardware and software). In this example, the user 102 is viewing VR space 108 in HMD device 104. The portable electronic device 106 may be operably (e.g., communicably) coupled with, or paired with the HMD device 104 via, for example, a wired connection, or a wireless connection such as, for example, a Wi-Fi or Bluetooth connection. This pairing, or operable coupling, of the portable electronic device 106 and the HMD device 104 may provide for communication and the exchange of data between the portable electronic device 106 and the HMD device 104 as well as communications with other devices associated with users accessing (or attempting to access) VR space 108.

In some implementations, being provided access to objects in the VR space may include meeting particular threshold distances from users and/or virtual objects in the space. For example, if a user (or a device associated with the user) is near a proximity boundary indicated by a virtual object, the systems described herein may determine whether or not the user (or device) meets criteria to be provided access. In some implementations, access to objects in the VR space may include detecting whether a user is attempting to access a particular object and performing analysis on user movement, gaze, or other user actions. Such criteria can include, but is not limited to a privacy profile, an experience level, an approval of an administrator or other VR space user, etc. In some implementations, a user may have to meet particular privacy thresholds dictated by other users in the VR space. In general, an exchange of data can be privatized or publicized based on one or more privacy configurations for the VR space and/or VR content accessed in the VR space.

Portable electronic device 106 may be manipulated by a user. Portable electronic device 106 and the manipulations executed by the user can be analyzed to determine whether the manipulations are configured to be privatized for the user or users authorized to view private VR content for the user. Such manipulations may be translated into a corresponding selection, or movement, or other type of interaction, in an immersive VR space generated by the HMD device 104. This may include, for example, an interaction with, manipulation of, or adjustment of a virtual object, a change in scale or perspective with respect to the VR space, a movement (e.g., navigation, teleportation, transport) of the user from a current location in the VR space to a selected destination or feature in the VR space, and other such interactions. The interactions may be privatized or publicized based on one or more privacy configurations for the VR space and/or VR content accessed in the VR space. Privatized interactions may include actions that correlate to settings for virtual objects or for the VR space that are intended a particular user or users that have been provided permission from the particular user to access virtual objects (or a VR space). If interactions are privatized, users that have permission to view or engage with virtual objects or space are allowed to do so. In some implementations, publicized interactions pertain to interactions/actions that have no privacy definition. In some implementations, publicized interactions pertain to interactions/actions that are specifically defined to be publicly shown to any user in the VR space. The privatizing or publicizing of interactions may be user-defined or system-defined In one example, the VR space 108 may include tracking systems that can use location data associated with VR devices (e.g., controllers, HMD devices, mobile devices, etc.) as a basis to correlate data such as display information, safety information, user data, or other obtainable data. This data can be shared amongst users accessing the same VR space 108 in the event that such data is deemed public. If the data is private, the systems and methods described herein can hide or obfuscate the data from users other than the owner of the data or users that the owner configures access.

In some implementations, the VR space 108 may include aspects of an augmented reality and/or mixed reality. For example, virtual objects depicted in the VR space 108 may include augmentations based on system-defined or user-defined input and/or requests to modify objects or other content in the VR space 108. Privacy modes and settings may apply to augmented reality content as well as mixed reality content. Such modes and settings can be applied in a similar fashion to the virtual reality privacy modes and settings.

As shown in FIG. 1, the user 102 is accessing VR space 108. The VR space 108 is divided into various regions for providing VR content. The various regions (and content therein) may be configured as private or public and can be switched between private and public by the user generating or interacting with such VR content. In some implementations, the various regions (and the content therein) can be configured as public or private by the VR system, by a user that initiated the VR content, a VR content developer, or a VR director.

In the depicted example, the user 102 has begun playing a card game in area 110. The card game in area 110 is being shared with one or more other users (not shown) accessing VR space 108, as indicated by icon 112. Accordingly, users accessing VR space 108 may view and interact with the card game being played in area 110. Similarly, area 114 depicts a message received from user "Holly." Area 114 is also shared amongst one or more users of VR space 108, as indicated by icon 116. In one example, the message may be associated with the card game in area 110 and as such, may be configured to be shared amongst all users playing the game or accessing VR space 108. In another example, the user 102 may have configured her messages to be public in VR space 108 and as such, each message may be broadcast to users accessing VR space 108. In yet another example, the user 102 may have configured notifications to be public in VR space 108 and accordingly, the notification in area 114 may be depicted as public, while the actual message associated with notification is private.

An area 118 is also shown to the user 102 in VR space 108. The area 118 is configured as private, as indicated by icon 120. Area 118 shows a location 122 associated with user 102 and has been configured by the user as private. Area 124 is also configured as private. Area 124 may be associated with public area 110, but may be configured as private by a VR system or the user 102 based on the context of the user entering a financial transaction in which funds may be retrieved and passwords or PIN passwords may be entered. Here, the user is entering a PIN number and as such, other users of VR space 108 may not view the users input. In addition, the systems described herein may configure the privacy of area 124 to automatically stop transmitting input content, user movements, and/or user audio. Instead, the VR space 108 may appear to users other than user 102 as a card game in progress with a message from "Holly" at area 114 and without areas 118 and 124.

In some implementations, the VR system described herein may invoke one or more algorithms to scramble user PIN input based on the context of the user entering a financial transaction on a financial website or as part of the card game in area 110, for example. One example algorithm may include detecting input and privacy settings. In response to detecting a private configuration, the algorithm may scramble pixels associated with the user input or gesture, or scramble the input by providing inaccurate numbers to users other than user 102. For example, if a user enters text using a keyboard, the VR system 210 can detect a privacy mode as private and can show the user typing, but may scramble the outgoing text to be displayed and can also shift the keyboard to show letters that the user is not actually selecting on the keyboard. This can provide the advantage of providing a consistent feeling of presence for all users in the VR space, while allowing privacy for text input. One example method of implementing a scrambling algorithm is to introduce an offset vector in which a number is selected (e.g., from 1 to 8) and the closer a user is to one, the offset vector is again added to the motion and display content is reconfigured to display output in a different way in the VR space. The user is still shown typing, but the movements cannot be discerned as useful text (e.g., words).

The VR system 210 includes a privacy engine 216. The privacy engine 216 may be configured to apply and modify privacy settings (e.g., pertaining to privacy properties) applicable to users, virtual objects, menus, input, or output associated with a VR space.

The privacy engine 216 can trigger modifications to displayed content in the VR space. For example, the privacy engine 216 can modify input or output associated with content in the VR space or users accessing the VR space. The modifications may include visually, audial, or tactilely changing any of the virtual objects, user representation, data, input or output provided in the VR space. The modifications may include hiding, scrambling, changing VR content and/or muting VR audio content occurring after a selected time.

In one example, the privacy engine 216 can hide display data associated with input by providing the display data to the user providing the input, but obfuscating the display data for users other than the user providing the input. The display data may pertain to input, information, or gestures, or interactions associated with VR content that can be displayed in the VR space. As a specific example, first data that is input by a first user may be displayed to the first user as it is input by the first user. The first data can be modified (e.g., obfuscated) to be second data when displayed for and viewed by a second user (e.g., a third party viewer). Modified display data may pertain to changing VR content for display to one or more users that are not providing, interaction, or being associated with the VR content and/or not authorized to view the VR content. The modification can change how users that are not associated with the VR content or not authorized to view the VR content.

In some implementations, the privacy engine 216 may modify data for specific users, but allow the same data to be unmodified for the user associated with the data and/or users authorized to view the unmodified data. The unmodified data may be provided for display in the VR space for a first user and a second user, while a modified version of the data is displayed in the VR space is displayed to other users accessing the VR space. The modified version may be provided to the other users based upon a system configuration for user or data privacy or a user-based configuration for user or data privacy.

In another example, the privacy engine 216 can hide the information exchange mechanism or modify the information exchange mechanism. As a specific example, a first gesture that is input by a first user may be displayed to the first user as it is provided and displayed by the first user. The display of the first gesture can be modified (e.g., hidden, changed to appear differently or interact with modified VR content) to be second and different displayed gesture when displayed for and viewed by a second user (e.g., a third party viewer). In particular, the engine 216 can hide user movements, gestures, or devices associated with particular information, information exchange, and/or VR content, as well as any display corresponding to such input for users other than the user initially associated with the information, information exchange, and/or VR content.

If the information or information exchange corresponds to content displayable in the VR space that is private and/or associated with private data, the privacy engine 216 can hide the input and display of such content. In other examples, the privacy engine 216 can alter content to obfuscate the content from users other than a user providing the input and/or content. The alteration can, for example, include hiding the content, scrambling pixels within the content, and/or otherwise modifying the content. For example, if a first user enters a text message in a texting application associated with the VR space, the system 200 may detect that information associated with the texting application is configured to be private. In response to detecting a message input by the first user, the system 100 can scramble message content for a second user that is not authorized to view such content. The display in the VR space for the first user may include the message content while the display in the VR space for the second user may include display of scrambled text or symbols rather than text. In some implementations, the alteration can include hiding the display of input or content to users other than the user providing the input.

The privacy engine 216 includes one or more privacy modes 218. Example privacy modes may include privacy settings that define modes that are public, private, semi-private, or view only privacy modes.

A public mode can allow viewing and interaction with virtual objects and content within the same VR space. For example, a public mode may enable users of a particular VR space to view, modify, and interact with VR content generated by each user and/or view, modify, and interact with activities in which another user otherwise engages.

The private mode may block display from users other than the single user viewing, modifying, or interacting with content. For example, if a first user modifies, enters, or interacts with VR content in the VR space, the private mode may block, modify, or scramble display of the actual modification, entry or interaction for a second user (and/or other users) in the VR space.

A semi-private mode may provide access to a number of users in a particular VR space while blocking other users. The semi-private mode can be user-configured or system-configured. In some implementations, a first user can configure particular information to be public to a second user(s) when in a co-presence scenario in the VR space, but for such information to be otherwise private and/or unavailable outside of the co-presence scenario.

View only modes may provide view of particular content and virtual objects, but may restrict interaction to such content or objects by other users in the VR space. For example, when a first user views and interacts with VR content in the VR space, the view only mode may provide display, to a second user, the interaction and content on display for the first user, but may block interaction for the second user.

In some implementations, the privacy modes may also include a whisper mode in which two users accessing the same VR space can have audio and/or visual access to private content and commentary. For example, if a first user is making eye contact (e.g., detected by eye gaze in tracking system 212) with a second user in the VR space, both users can confer (e.g., discuss) privately amongst each other and the systems described herein can block other users (separate from the first user and the second user) in the VR space from viewing or hearing content discussed or performed during such an interaction between the first user and the second user. The eye contact based whisper mode may be invoked by two users that perform an initial gaze for a length of time. The initial gaze may be triggered if both users gaze at each other for a predefined amount of time. For example, if the first user gazes at the second user and the second user engages to gaze with the first user, after about three to about five seconds, the whisper privacy mode can be invoked between the two users. To exit the whisper mode, one or both of the users can gaze away or turn a head or body away from the other user.

The VR application 214 includes a prediction engine 220 and a context engine 222. The prediction engine 220 may access any number of memory storage and/or sensors described herein to determine particular incoming movements associated with controllers, users, content, virtual objects, and/or privacy settings. The prediction engine 220 can generate a number of prediction events that may occur based on user contextual cues. Prediction events may include, but are not limited to, proximity indicators near objects, opening of applications, and/or gestures associated with objects, contents, or applications. In some implementations, the prediction engine 220 may include prediction models that include predictions related to time. For example, the prediction models may determine a predicted time of an event.

The VR application may also include or be associated with privacy settings 224 and privacy properties 226 that users, VR directors, and VR application developers can configure for VR spaces and may pertain to users, gestures, virtual objects, applications, events, or other VR related content. Privacy settings 224 may refer to definitions selectable to deem data such as content, audio, visual, textual, and/or tactile data or metadata as private or public with respect to user access and usage of such data. In some implementations, privacy settings may refer to system level privacy settings that apply to files, folders, applications, etc. In the VR space, these system details may be represented as virtual objects (e.g., a visual representation of the files, folders, applications, etc.). The privacy settings 224 can be assigned to virtual objects and upon the user accessing such objects, the VR system 210 can indicate a level of privacy for each object. This can provide an advantage of allowing a user to understand which content is private and which content is public.

Privacy properties 226 may refer to user or virtual object related data. For example, a user (e.g., a user account) may be associated with a number of privacy properties pertaining to information exchange mechanisms and data and output mechanisms and data. In particular, if the information exchange mechanism is a keyboard and the output mechanism is a display on a computing device or in a VR space, the privacy properties 226 may include typed data, motions performed by the user to type the data (e.g., tracking data related to the motions), and output of the typed data, display data, stored data, etc. If the information exchange mechanism is a gesture in the VR space and the output mechanism is display in the VR space, the privacy properties 226 may include tracked gestures, menus selections, audio associated with the gestures, and output of any or all related input gestures. Privacy properties 226 may be configured as rules and can be carried out in response to triggers occurring in the VR space.

Particular implementations described in this disclosure may enable a user to use one or more controllers, computing devices, objects, or gestures to interact with the VR space for purposes of entering text into applications or with respect to virtual objects in the VR space. Controllers and devices associated with VR system 210 can be tracked by tracking system 212, for example. In particular, devices in communication with VR system 210 can be viewed and/or tracked in system 200 in order to facilitate interaction in the VR space.

The tracking system 212 can be used to track one or more devices used to access the VR space. The devices may be tracked based on position, velocity, and acceleration data obtainable from particular computing devices, controllers, and/or base station devices represented in the VR space. For example, data may be obtained from an inertial measurement unit (IMU) associated with one or more devices while location data may be obtained from one or more tracked object (e.g., controllers, HMD devices) and/or base station modules 228 or orientation modules 230 associated with the VR space.

Additional data may also be obtained from a number of onboard sensors associated with devices accessing the VR space. Such data may pertain to accelerometer and gyroscope data, orientation data, correction data, and/or other sensor data indicating general or specific location information. The systems described herein can use such data to correlate six degrees of freedom of positional information for a tracked object within a predefined range to one or more other devices within the predefined range. The predefined range may be the entire VR space, a subset of the VR space, or other measurable range with respect to a user accessing the VR space.

In some implementations, the systems and methods described herein can access sensors associated with particular VR hardware to detect particular physical aspects about a user accessing the VR space. For example, an accelerometer on a user's mobile device communicably coupled to the VR space can be analyzed to detect whether the user is entering input in the VR space. The input may be textual, audio, gesture-based, and/or tactile in nature.

Figure 2:
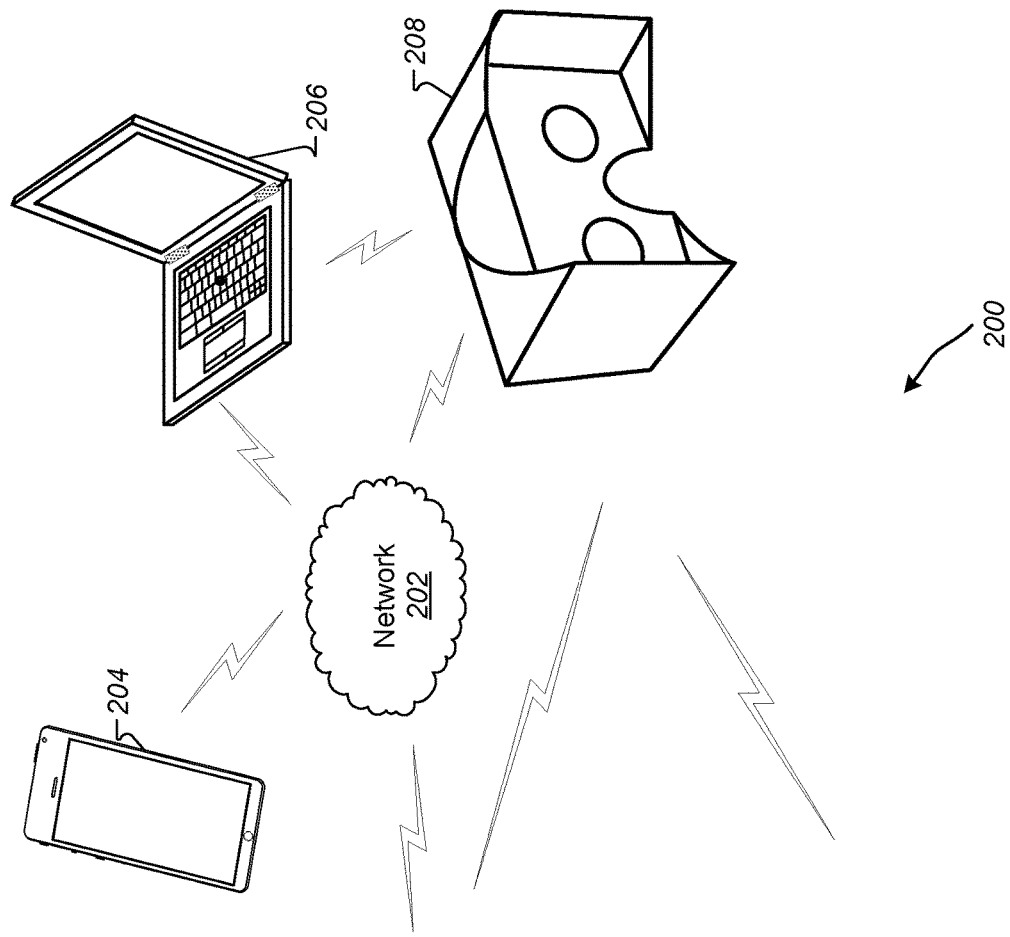
FIG. 2 is a block diagram of an example system for providing input privacy in the VR space.

Referring now to FIG. 2, a block diagram is depicted of an example system 200 for providing input privacy in a VR space. The system 200 may provide a 3D VR space and 3D (volumetric) objects and VR content using the methods, components, and techniques described herein. In particular, system 200 can provide a user with a number of options in which to view private and public content and to interact with controllers to manipulate virtual objects and/or text entry within the VR space.

The example system 200 includes a number of computing devices that can exchange data over a network 202. The devices may represent clients or servers and can communicate via network 202, or another network. In some implementations, the client devices may include one or more gaming devices or controllers, a mobile device, an electronic tablet, a laptop, a camera, VR glasses, or other such electronic device that may be used to access VR content.

As shown in FIG. 2, the system 200 includes a mobile device 204, a laptop computing device 206, a VR headset and/or a head mounted display (HMD) device 208, a VR system 210, and a tracking system 212. Devices 204, 206, and 208 may represent client devices. Mobile device 204, computing device 206, and HMD device 208 can include one or more processors and one or more memory devices. The devices 204-208 can execute a client operating system and one or more client applications that can access, control, and/or display VR content on a display device included in each respective device, or in a connected device.

The VR system 210 may represent a server device. In general, VR system 210 may include any number of repositories storing content and/or virtual reality software modules that can generate, modify, or execute virtual reality scenes. In the depicted example, VR system 210 includes a VR application 214 that can access and present content and/or controls for system 210. In some implementations, VR application 214 can run locally on one or more of devices 204-208. The VR application 214 can be configured to execute on any of devices 204, 206, and 208 and be controlled or operated upon using virtual controllers. In addition, the VR system 210 may be accessed and shared by any number of users as part of a shared VR space, for example.

In some implementations, the VR system 210 may include or be communicably coupled to any number of processors and one or more computing devices capable of generating a VR experiences in a VR space (e.g., immersive virtual reality environment). In general, the one or more computing devices may be portable in a physical environment while a user accesses the VR space. In some implementations, the VR system 210 includes or is communicably coupled to a number of sensors capable of communicating with one or more electronic computing device. The sensors (not shown) may be configured to detect motion associated with a user accessing the at least one electronic computing device within the physical space.

The HMD device 208 may represent a virtual reality headset, glasses, eyepiece, or other wearable device capable of displaying virtual reality content. In operation, the HMD device 208 can execute a VR application 214, which can playback received and/or processed images to a user. In some implementations, the VR application 214 can be hosted by one or more of the devices 204, 206, or 208, shown in FIG. 2, or another device.

In some implementations, the example HMD device 208 may include a housing coupled to a frame, with an audio output device including, for example, speakers mounted in headphones. In the example HMD device 208, a display (not shown) may be mounted on an interior facing side of the front portion of the housing. Lenses may be mounted in the housing, between the user's eyes and the display. In some implementations, the HMD device 208 may include a sensing system including various sensors such as, for example, audio sensor(s), image/light sensor(s), positional sensors (e.g., inertial measurement unit including gyroscope and accelerometer), and the like. The HMD device 208 may also include a control system including processors and various control system devices to facilitate operation of the device 208.

In some implementations, the HMD device 208 may include one or more cameras (not shown) to capture still and moving images. The images captured by such cameras may be used to help track a physical position of the user or part of the user and/or controllers, computing devices, or other systems interoperable with VR system 210 in the real world, or physical environment relative to the VR space, and/or may be displayed to the user on the display in a pass through mode, allowing the user to temporarily leave the virtual environment and return to the physical environment without removing the HMD device 208 or otherwise changing the configuration of the HMD device 208.

In some implementations, the mobile device 204 can be placed and/or located within the HMD device 208. The mobile device 204 can include a display device that can be used as the display screen for the HMD device 208. The mobile device 204 can include hardware and/or software for executing the VR application 214. In some implementations, HMD device 208 can provide full tracking of location and user movements within six degrees of freedom. The tracking can be based on user hand movements, finger movements, head movements, eye movements, or tracking of controllers moving based on user input.

Additional devices are possible and such devices may be configured to be substituted for one another. In some implementations, the devices 204, 206, and 208 can be laptop or desktop computers, smartphones, personal digital assistants, portable media players, tablet computers, gaming devices, or other appropriate computing devices that can communicate, using the network 202, with other computing devices or computer systems.

In the example system 200, the HMD device 208 can be connected to device 204 or device 206 to access VR content on VR system 210, for example. Device 204 or 206 can be connected (wired or wirelessly) to HMD device 208, which can provide VR content for display in the VR space.

In some implementations, one or more content servers (e.g., VR system 210) and one or more computer-readable storage devices can communicate with the computing devices 204-208 using network 202 to provide VR content to the devices 204-208. In some implementations, the network 202 can be a public communications network (e.g., the Internet, cellular data network, dialup modems over a telephone network) or a private communications network. In some implementations, the computing devices 204-208 can communicate with the network 202 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

Figure 3:
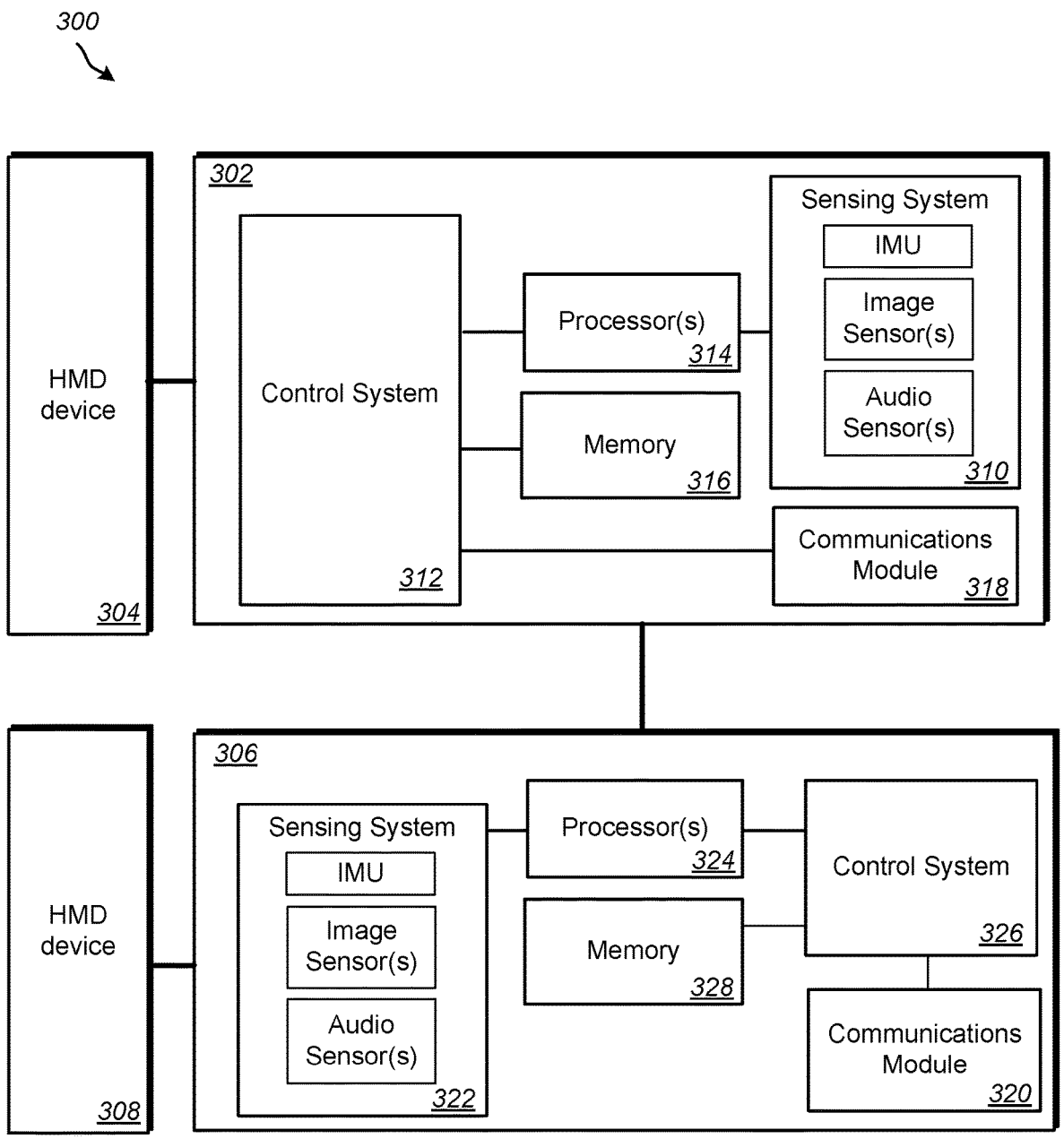
FIG. 3 is a block diagram depicting computing devices communicably coupled to a head-mounted display (HMD) device in the VR space.

FIG. 3 is a block diagram depicting any number of computing devices communicably coupled to an HMD device in a common VR space. The devices described in system 300 may be configured to interface with the privacy modes described herein. In operation, system 300 can be configured to provide a VR space housing any number of virtual objects that can be manipulated with VR application software, computers, and controller devices configured to interact with the VR space. For example, controllers 302 may interface with HMD device 304 to generate an immersive VR space and controller 306 may interface with HMD device 308 to generate an immersive VR space. In some implementations, the VR space is the same VR space for both users associated with devices 304 and 308. Each device 302 and 306 may generate different input and/o r changes to the VR space and particular changes may or may not be provided for view to other users.

The controller 302 may be paired with HMD device 304, for example, to establish communication between the devices and to facilitate user interaction with the VR space. Similarly, the controller 306 may be paired with HMD device 308. In addition, device 302 and 306 may communicate. In some implementations, each device 302 and 306 (and other controllers in the same VR space) may be tracked by a tracking system (e.g., tracking system 212) or another external tracking device.

As shown in FIG. 3, the controller 302 includes a sensing system 310 and a control system 312. The sensing system 310 may include one or more different types of sensors, including, for example, a light sensor, an audio sensor, an image sensor, a distance/proximity sensor, a positional sensor (e.g., an inertial measurement unit (IMU) including a gyroscope and accelerometer) and/or other sensors and/or different combination(s) of sensors, including, for example, an image sensor positioned to detect and track eye gaze associated with a user. The control system 312 may include, for example, a power/pause control device, audio and video control devices, an optical control device, a transition control device, and/or other such devices and/or different combination(s) of devices. The sensing system 310 and/or the control system 312 may include more, or fewer, devices, depending on a particular implementation.

The controller 302 may also include at least one processor 314 in communication with the sensing system 310 and the control system 312, a memory 316, and a communication module 318 providing for communication between controller 302 and another, external device, such as, for example, controller 306 and/or HMD device 304.

Controller 306 may include a communication module 320 providing for communication between controller 306 and another, external device, such as, for example, HMD device 308. In addition to providing for the exchange of data between controller 306 and controller 302, and HMD device 308, the communication module 320 may also be configured to connect and/or communicate with a number of other electronic devices, computers, and/or controllers accessible to the VR space and system 300.

The controller 306 may include a sensing system 322 including an image sensor and an audio sensor, such as is included in, for example, a camera and microphone, an IMU, a touch sensor such as is included in a touch sensitive surface of a controller, or smartphone, and other such sensors and/or different combination(s) of sensors. At least one processor 324 may be in communication with the sensing system 322 and a control system 326. The control system 326 may have access to a memory 328 and can control overall operation of controller 306.

Similar to controller 302, the control system 326 may include, for example, a power/pause control device, audio and video control devices, an optical control device, a transition control device, and/or other such devices and/or different combination(s) of devices. In general, the systems and methods described in this disclosure can track user hands or controllers 302 and 306 and analyze user interaction patterns and gestures associated with such hands and/or controllers 302 and 306 in the VR space to determine the intent of such interaction patterns and gestures. The tracking can be used to publicize or privatize particular data content, object changes, and user input.

Figure 4:
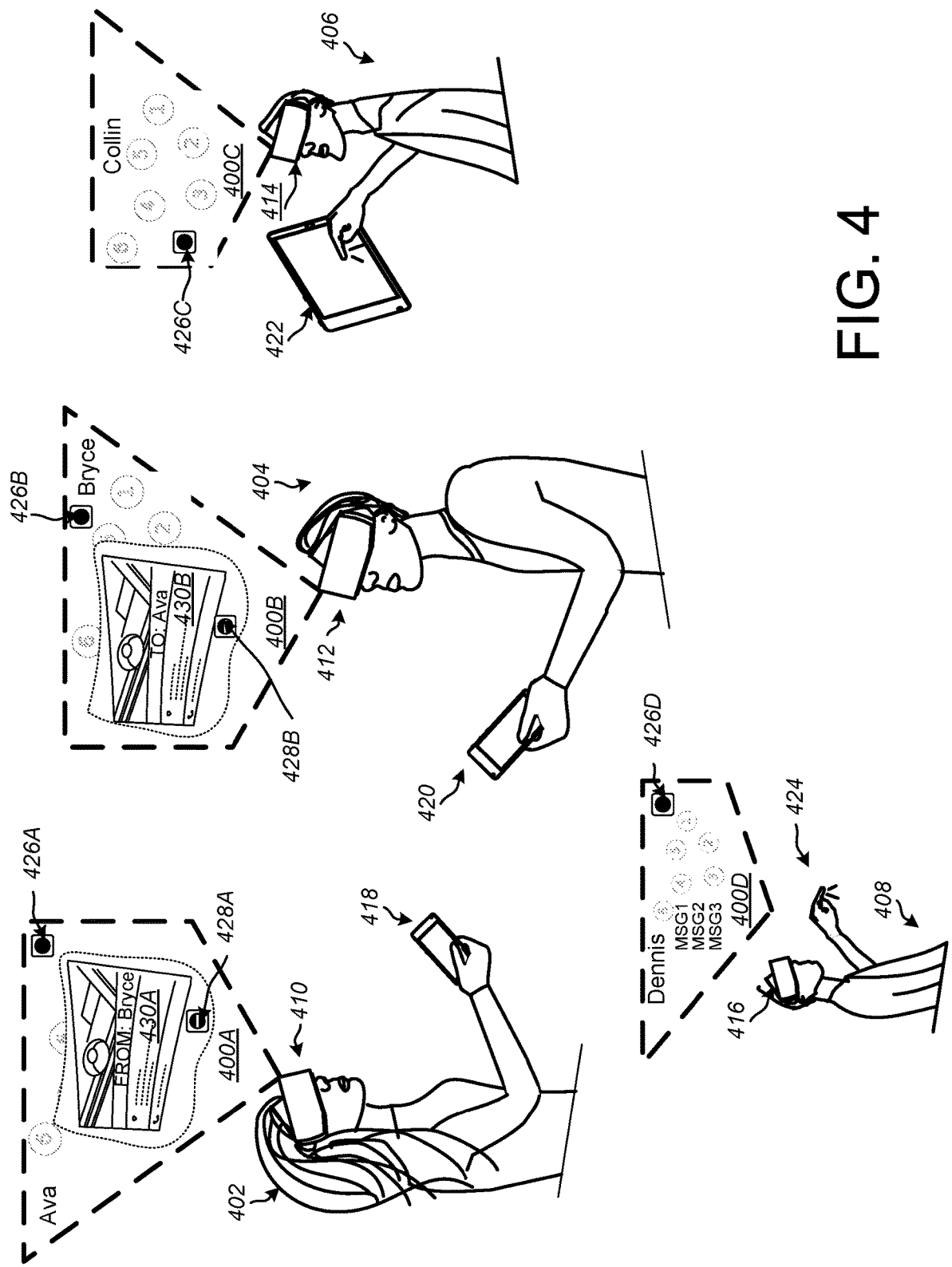
FIG. 4 is a diagram depicting an example of multiple users interacting in the same VR space.

FIG. 4 is a diagram depicting an example of multiple users interacting in the same VR space. The example implementation shown in FIG. 4 will be described with respect to one or more users wearing an HMD device that blocks out (e.g., substantially blocks out) the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, the examples shown in FIG. 4 include a user illustrated as a third-person view of the user wearing an HMD device and holding controllers, computing devices, etc. The views in areas 400A, 400B, 400C, and 400D represent a first person view of what may be viewed by each respective user in the VR space generated by each user's respective HMD device and the systems described herein.

Although four users (e.g., Ava 402, Bryce 404, Collin 406, and Dennis 408) are depicted in FIG. 4, any number of users can access and interact within the VR space. As shown, each user is accessing or associated with an HMD device (e.g., respective devices 410 for user 402, device 412 for user 404, device 414 for user 406, and device 416 for user 408. In addition, each user may be associated with one or more controllers and/or computing devices. As shown in this example, user 402 is associated with computing device 418, user 404 is associated with computing device 420, and user 406 is associated with tablet computing device 422. User 408 is shown generating input using gestures 424. Such gestures 424 may be detected and tracked via tracking devices within the VR space and/or tracking devices associated with a user (e.g., mobile device in the user's pocket, or near the user, etc.).

Each user 400A-400D is experiencing content in the VR space. For example, the users are all experiencing and viewing the number content 1, 2, 3, 4, 5, and 6 as virtual content in the VR space. This virtual content is provided to all users in the VR space. In one example, the virtual content represents a game underway in the VR space. In another example, the virtual content represents a virtual environment with virtual objects that each user can interact with in the VR space. In other examples, the virtual content may be a movie, a teleconference, a gaming or online session, or other interactive content accessible by multiple users in virtual reality.

Particular content depicted for one or more users 600A-600D may be deemed by a user or a VR system as public or private. For example, a user can enter privacy settings pertaining to data, virtual objects, virtual content, input/out gestures, messaging, etc. In another example, the VR system can configure privacy settings. Each VR space displayed to a user can include a number of icons that indicate whether particular views/portions of the VR space are private to the user and thus blocked from view for other users and which portions of the VR space are public to all users or a portion of users interacting in VR space. The icons provide an advantage of allowing each user to determine (e.g., determine quickly) which portions of a view of the VR space are public and which portions of a view of the VR space are private.

Example public icons are shown at 426A, 426B, 426C, and 426D. Such icons indicate that all users or a selected portion of users can view content in the VR space. Example private icons are shown at 428A and 428B. In this example, the user 402 is exchanging messages 430A and 430B with user 404 and such messages are marked as private and viewable by users 402 and 404, but not viewable by other users in the VR space. The users may have marked the exchange of messages private or the VR system may have determined that messaging is private by detecting a context of use of messages or other associated virtual objects in the VR space. An example context of use may include contextual cues (based on pre-configured privacy rules) that a user is causing to trigger, in the VR space, financial data, calendar information, personal email (or work email), or other data deemed sensitive by the user or the VR system.

In some implementations, the VR system 210 can be configured to detect gestures associated with one or more users accessing a VR space. For example, gestures 424 may be detected and tracked via tracking devices within the VR space and/or tracking devices associated with a user (e.g., mobile device in the user's pocket, or near the user, etc.). The tracking can be combined with the pre-configured rules to trigger display or hiding of content in the VR space in response to determinations made on privacy settings.

Figure 5:
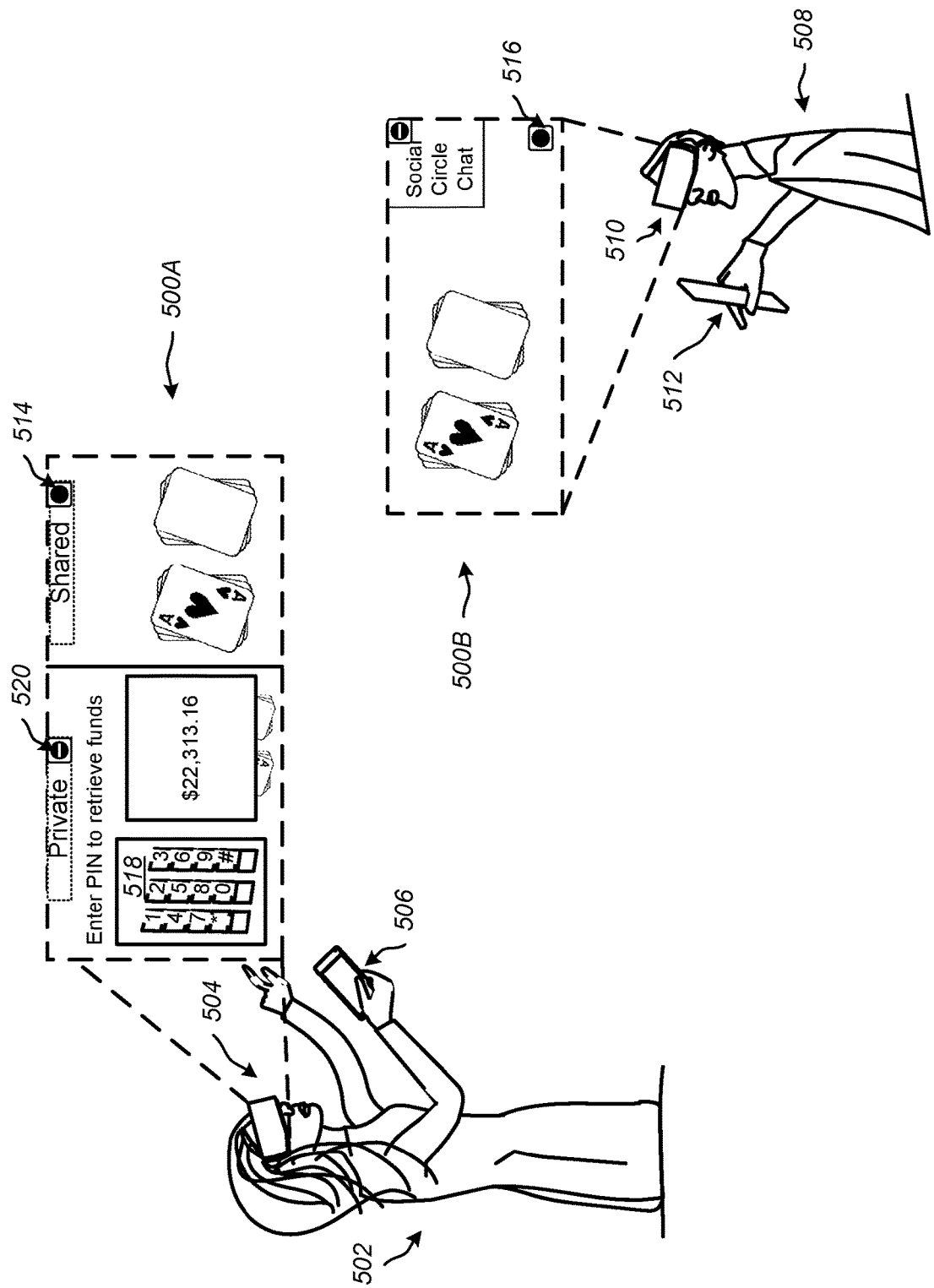
FIG. 5 is a diagram depicting another example of multiple users interacting in a VR space.

FIG. 5 is a diagram depicting an example of multiple users interacting in a VR space. The example implementation shown in FIG. 5 will be described with respect to one or more users wearing an HMD device that substantially blocks out the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, the examples shown in FIG. 5 include users illustrated as a third-person view of the users each wearing an HMD device and holding controllers, computing devices, etc. The views in VR spaces 500A and 500B represent a first person view of what may be viewed by each respective user in the VR space generated by each user's respective HMD device and the systems described herein.

As shown, a first user 502 is accessing or associated with an HMD device 504 and a computing device 506, while a second user 508 is accessing or associated with an HMD device 510 and a device 512. In addition, each user may be associated with one or more controllers and/or additional computing devices. As shown in this example, user 502 is associated with computing device 506 and user 508 is associated with computing controller 512. The VR system 210 may provide application data, privacy data, while tracking system 212 may track movements and input into the VR space.

The user 502 may be engaged with user 508 in a card game in a shared portion of VR space 500A and respective shared portion of VR space 500B, as indicated by respective icons 514 and 516. In addition, the user 502 may be accessing a financial application and entering a personal identification number on number pad 518 to access funds to continue playing the shared card game. Although the private area indicated by icon 520 is described as associated with shared content in another portion of VR space 500A, the private and shared (e.g., public) content may or may not be related.

In one example, the private portion of VR space 500A may be deemed private by a user before entering the VR space or in real-time by the user upon entering into the VR space or into the financial application. In some implementations, the VR system 210 may detect that the user 502 is providing input associated with financial data (or other sensitive user or object data). If the system 210 determines that the user is entering additional input that includes personal data, the system may change a privacy setting associated with the financial data (e.g., virtual object or application depicting the data) from public to private. Changing a privacy setting associated with the financial data from public to private may include modifying a view of the VR space for users other than the user accessing the financial data and/or financial application. In addition, the privacy setting may include modifications pertaining to a view of the financial data, the data itself can be modified or changed, and the input motions or gestures provided to the financial application may also be modified. Modifying the view of the financial application or data may include scrambling the data or input when displaying inputs or data to other users in the VR space.

In one example, the user 502 may be entering credentials into a financial application depicted into area 500A in the VR space. The VR system 210 may determine that the credentials are associated with sensitive user data and can apply privacy settings to obfuscate from view, for other users in the VR space, the data, the user motions entering the data, and applications and files or menus accessed using the data, etc. In one example, the VR system 210 may blur movements or data associated with the movements and the blurred version of such information may be displayed to other users in the VR space when the content being accessed is deemed private. Similarly, location or tracking data determined by the VR system 210 or tracking system 212 may be modified (e.g., blurred, scrambled, hidden, and/or encrypted, etc.) to disallow unauthorized user access to such data after a VR session. In another example, the VR system 210 may visually modify user movements or text entry appearances to obfuscate actual data being entered.

Figure 6A:
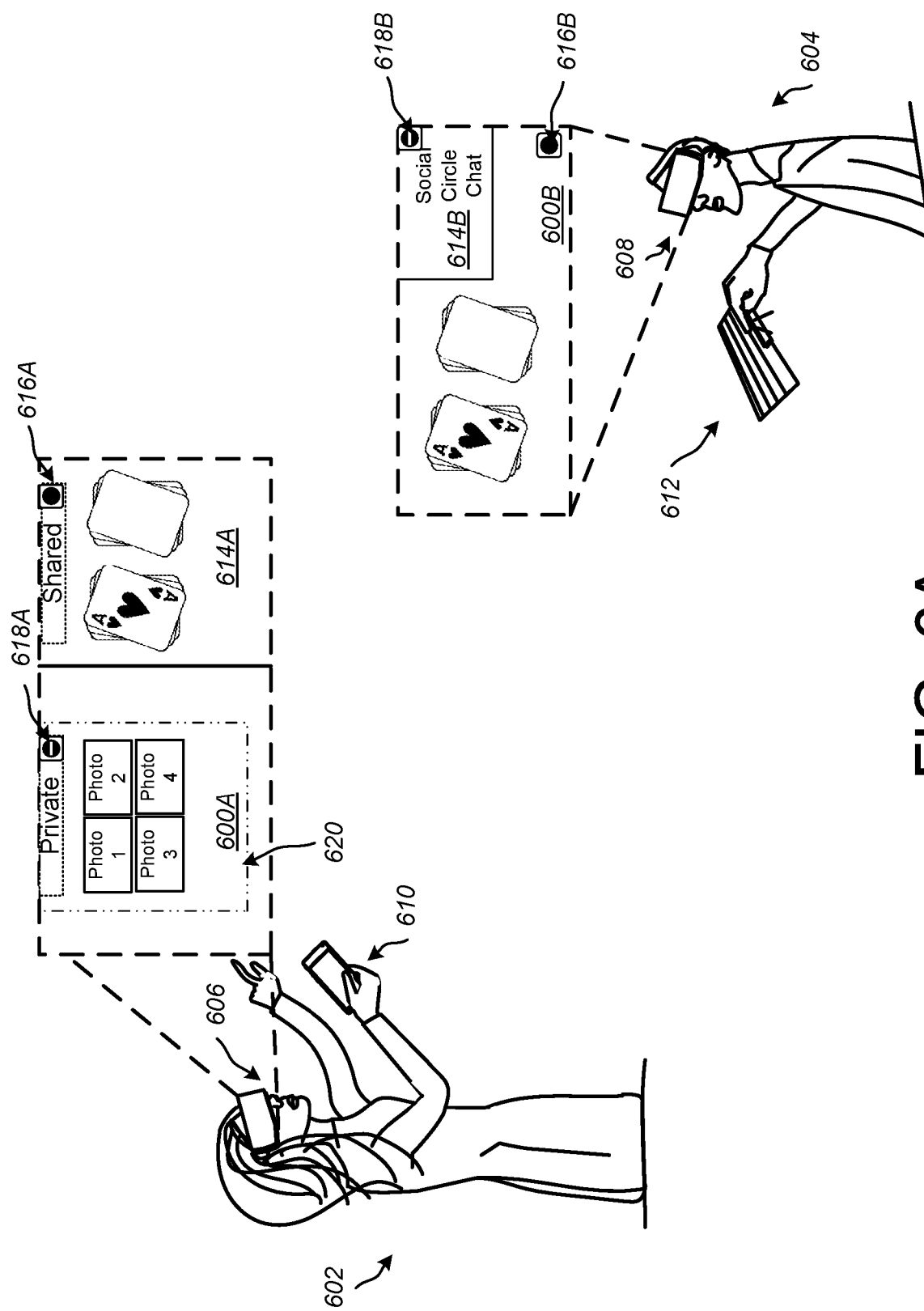
FIGS. 6A and 6B are diagrams depicting examples of multiple users interacting in a VR space.
Figure 6B:
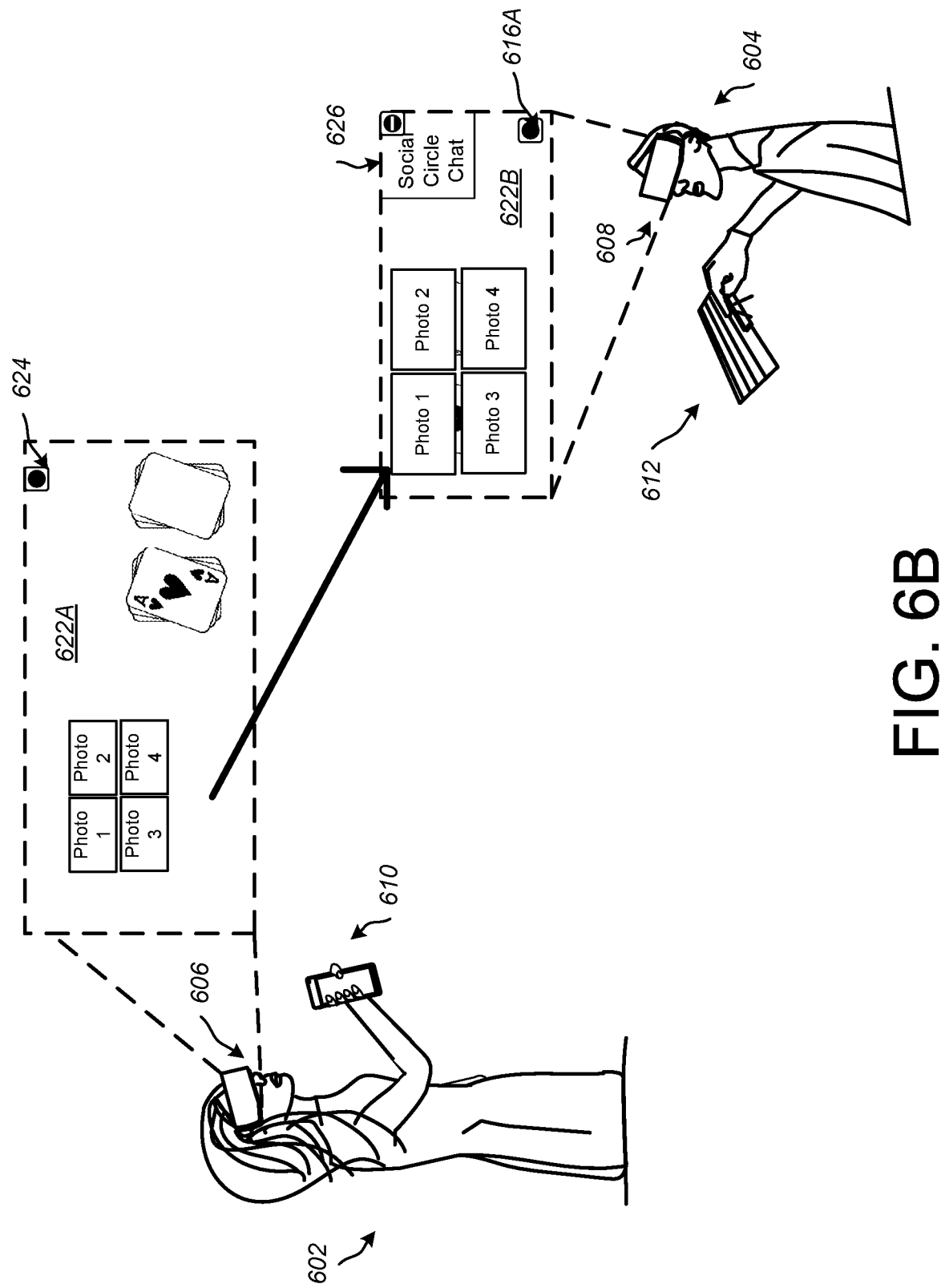

FIGS. 6A-6B are diagrams depicting examples of multiple users interacting in a VR space (600A-600B). The example implementations shown in FIGS. 6A-6B will be described with respect to one or more users wearing an HMD device that substantially blocks out the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, the examples shown in FIGS. 6A-6B include a user illustrated as a third-person view of the user wearing an HMD device and holding controllers, computing devices, etc. The views in areas 600A and 600B represent a first person view of what may be viewed by each respective user in the VR space generated by each user's respective HMD device and the systems described herein.

Although two users (e.g., users 602 and 604) are depicted, any number of users can access and interact within the VR space. As shown, each user is accessing or associated with an HMD device (e.g., respective devices 606 for user 602, device 608 for user 604). In addition, each user may be associated with one or more controllers and/or computing devices. As shown in this example, user 602 is associated with computing device 610 and user 604 is associated with computing device/keyboard 612. The VR system 210 may provide application data, privacy data, while tracking system 212 may track movements and input into the VR space.

The user 602 is playing a card game with user 604, as shown by shared content 614A and 614B. The shared content 614A and 614B is indicated as public by respective icons 616A and 616B. The user 602 is also accessing private content 600A while user 604 is accessing different private content 614B. The private content is indicated by respective icons 618A and 618B. The user 602 may select one or more icons 618A or 618B to change the privacy setting from public to private or from private to public.

In some implementations, private content may be indicated to a user accessing such content using other visual cues and/or indications. For example, the user 602 may view an overlay 620, a glow, a semi-transparency, or other visual treatment selected by the user or the VR system 210. The visual cue or indication can inform the user that she is accessing private content without having to provide icons or other non-immersive indicators for virtual objects.

As shown in FIG. 6A, the user 602 is accessing photographs 1-4 and the photographs are not displayed to any other users accessing the same VR space. User 604 is accessing a social circle chat privately and such content associated with the chat are not provided or displayed to any other users accessing the same VR space unless user 604 allows provision of the activity and/or content.

At some point, user 602 may wish to share content with another user accessing the same VR space. For example, user 602 may wish to share photographs 1-4 with user 604. In one example, the user can change her privacy settings to show user 604 and/or other users in the shared VR space. In another example, the VR system 210 can detect gestures, selections, or other input performed by the user and use such input to modify any number of privacy settings for particular virtual objects or users accessing a common VR space.

Referring to FIG. 6B, the user 602 has performed a gesture by flipping the computing device 610 from a position of the display screen facing the user (in FIG. 6A) to a position of facing away (or outward) from the user. Such a gesture may indicate first that the user is viewing content on computing device 610 (FIG. 6A) and now wishes to provide such content to other users in the immersive VR space. Accordingly, the system 210 can detect the gesture using tracking system 212, for example, and can change a privacy setting associated with the computing device 610 (or associated with user 602 or associated with a particular VR space) from private to public. Such a change may trigger display of the screen content from device 610 in the VR space. The display of such content may be provided to any or all other users accessing the same VR space.

In the example in FIG. 6B, an updated VR space area 622A and respective area 622B (and areas for other users accessing the VR space) have been updated from private to public, as indicated by icon 624. The card game between users is still displayed and may be interrupted with the new shared content overlain on the game. In some implementations, the content associated with the card game may be moved within the VR space for users other than user 602. Here, user 604 still maintains private content at area 626. Similarly, if user 602 were accessing other private content in VR space 622A, the other private content may not be shared with other users until the user determines to share such content or if the VR system 210 determines that a privacy setting has been triggered to change from private to public, for example.

Figure 7:
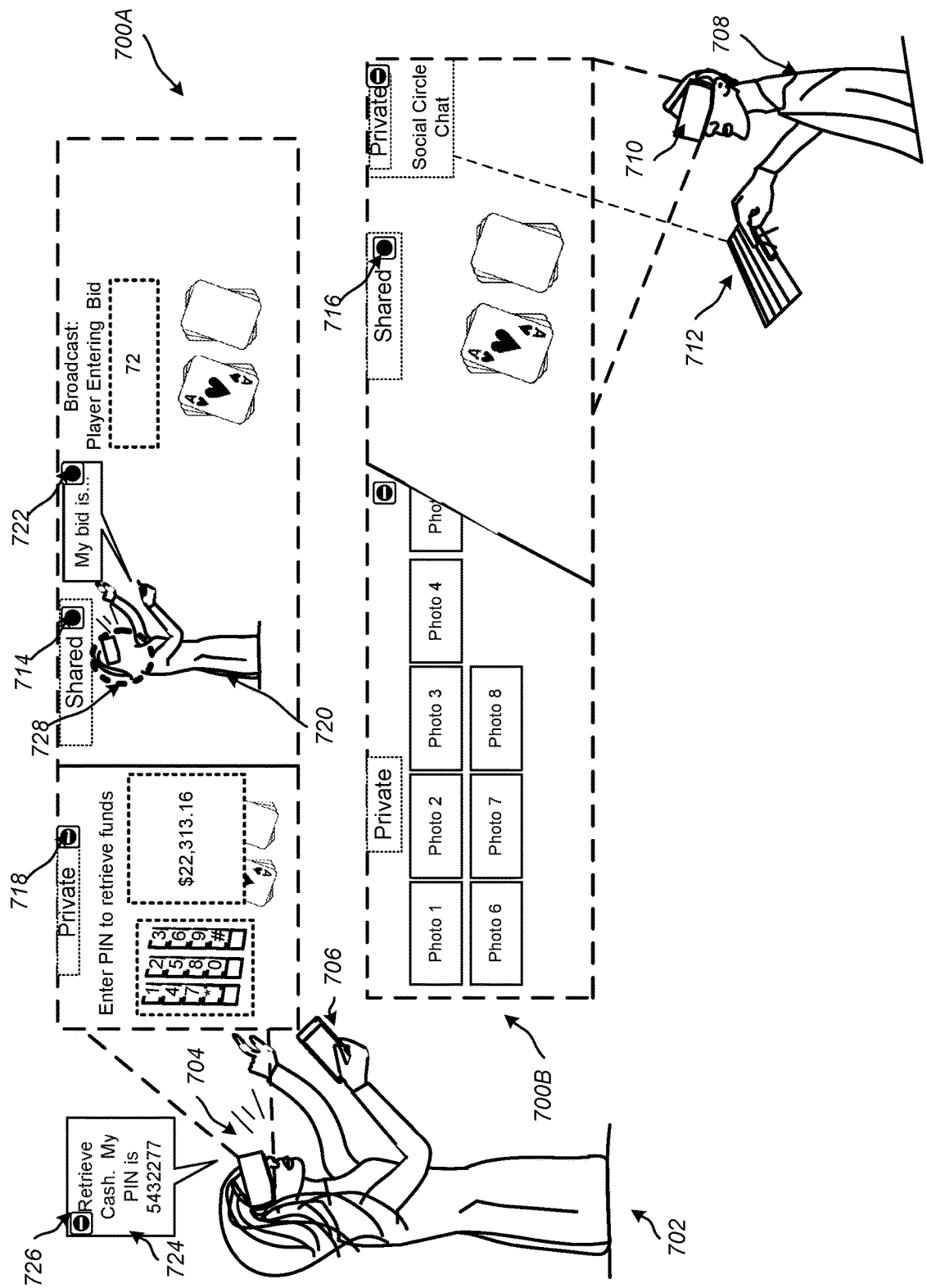
FIG. 7 is a diagram depicting an example of multiple users interacting in the same VR space.

FIG. 7 is a diagram depicting an example of multiple users interacting in the same VR space. The example implementation shown in FIG. 7 will be described with respect to one or more users wearing an HMD device that substantially blocks out the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, the examples shown in FIG. 7 include a user illustrated as a third-person view of the user wearing an HMD device and holding controllers, computing devices, etc. The views in areas 700A and 700B represent a first person view of what may be viewed by each respective user in the VR space generated by each user's respective HMD device and the systems described herein. The VR system 210 may provide application data, privacy data, while tracking system 212 may track movements and input into the VR space.

As shown, a user 702 is accessing or associated with an HMD device 704, which may be communicably coupled to mobile computing device 706. Similarly, a user 708 is accessing or associated with an HMD device 710, which may be communicably coupled to an input device 712. In this example, user 702 is accessing a VR space depicting content 700A while user 708 is accessing the same VR space and viewing content 700B. Both users are playing a card game and sharing content between the game in the VR space, as indicated by private icons 714 and 716.

User 702 is also attempting to access a financial application to retrieve funds. The user may be retrieving funds to play the game or alternatively simply paying bills in between game hands using an online service accessed in the VR space. Because the data may be sensitive, the VR system 210 and tracking system 212 may track input and movements, and may trigger particular data changes based on the input, movements, and interactions. For example, the financial application may be associated with a private mode of access. The mode may be preconfigured or user-configured by the VR application 214. If the mode is private for the financial application, user input to such applications may be deemed private and a private mode can be configured for the user 702, as indicated by icon 718. The private mode may ensure that user 708 (or other users in the same VR space) cannot visually see input, data, or output associated with the financial application. For example, the privacy engine 216 may visually obscure a personal identification pad, input into such a pad, the account detail, and/or other data configured or deemed as private. User 708 may view user 702 interacting, but may not see the content. In another example, user 708 may view user 702 interacting with a different application, substituted into the VR space by the system 210 in order to hide data and gestures. For example, the user 708 may view user 702 as shown at 720. The user at 720 is shown interacting with the game and is shown speaking, as indicated by shared audio content 722. However, the user 702 may actually be speaking her PIN number as indicated by audio input 724. Audio input 724 is configured as private, as shown by private icon 726. When the user 702 speaks her PIN password "5432277," the system 210 modifies the audio output to be "My bid is . . . ."

In another example, the system 210 may mute the audio entirely and can instead blur, remove, or otherwise hide portions of user 702 (e.g., user 720 shown in the VR space at circle 728) such that other users cannot view the user's words and obtain the PIN password. The above examples can provide an advantage of muting, blurring, or removing from view content that may otherwise be frozen or blocked with large shapes to secure the privacy of the user and data associated with the user. Thus, the systems and methods described herein provide comfortable interactions amongst users without breaking the virtual world presence.

In some implementations, the privacy engine 216 can deter users from maliciously recreating actions and input provided by another user into the VR space to gain access to private data. The engine 216 can deter such behavior by detecting user input (e.g., via mobile device, gesture, laser pointer, etc.) and switch letters around before displaying the content in the VR space. In the case of a direction device such as a controller or laser pointer, the system 210 can recognize the privacy settings and switch the movement and input, for example, by using a corrective vector algorithm to modify a direction or slope of an input.

Figure 8:
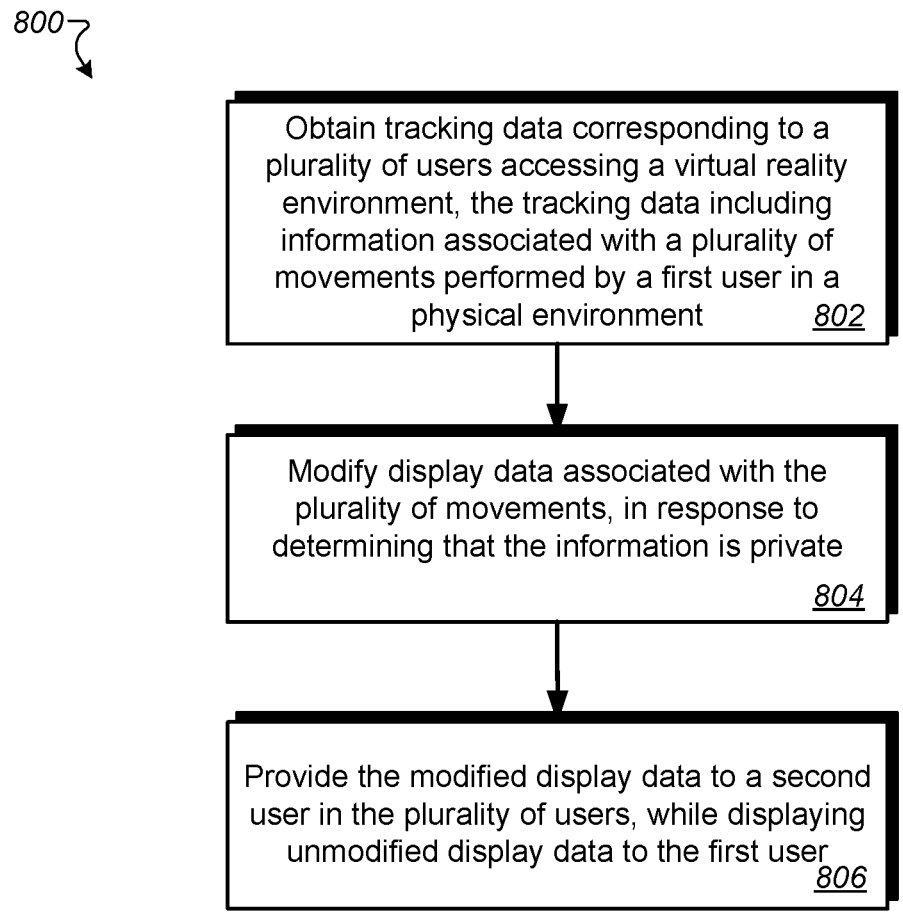
FIG. 8 is a flow chart diagramming one embodiment of a process to maintain information privacy.

FIG. 8 is a flow chart diagramming one embodiment of a process 800 to maintain information privacy. At block 802, the process 800 may include obtaining tracking data corresponding to a plurality of users accessing a virtual reality environment. The tracking data may include information associated with a plurality of movements performed by a first user in a physical environment. The information may correspond to display data displayable in the virtual environment. The display data may be associated with a respective computing device operated by the first user, and the information can be configured, by the first user, as private data.

In some implementations, the tracking movements may be associated with at least one of the users and a respective computing device. For example, the tracking system 212 may track user 502 providing input into VR space 500A. In particular, a user can perform motions for entering a personal identification number into an application in the VR space. The personal identification number may be input in the VR space 500A and can be tracked as gesture input and data input. In some implementations, the movements performed in the physical environment may include at least one gesture performed by at least one user, which can function to provide input to the VR space. In some implementations, the plurality of movements performed in the physical environment include at least one gesture performed by the first user and tracking the plurality of movements performed in the physical environment includes tracking at least one hand of the first user.

In some implementations, the plurality of movements are associated with text input provided by the first user at a respective computing device and determining that the information is private includes accessing, for the first user, preconfigured privacy settings. In some implementations, the plurality of movements are associated with an audio input provided, in the virtual environment, by the first user.

At step 804, the process 800 can include modifying display data associated with the plurality of movements, in response to determining that the information is private, for example. In some implementations, modifying display data associated with the plurality of movements includes scrambling hand motions associated with the at least one gesture.

In some implementations, modifying audio data provided to the second user includes modifying audio data by muting the first user with respect to what the second user hears in the VR space, until determining that the plurality of movements are no longer private.

At step 806, the process 800 may include providing, in the virtual environment, the modified display data to a second user while displaying unmodified display data to the first user. For example, a modified version of the information and display data may be provided to users other than the initiating first user while the first user views display data that is accurate to what the first user has entered or provided as input to the VR space.

In some implementations, the process 800 may include modifying the plurality of movements and displaying, in the virtual environment, the modified plurality of movements to the second user. For example, the modification may be selected from the group consisting of hiding the plurality of movements, scrambling the plurality of movements, changing the plurality of movements, muting the plurality of movements, hiding display data associated with the plurality of movements, hiding an information exchange mechanism associated with the plurality of movements in the virtual environment, modifying an information exchange mechanism associated with the plurality of movements in the virtual environment. In some implementations, modifying the display data is performed to obfuscate the display data from the second user. The modification may be selected from the group consisting of hiding the display data, scrambling the display data, and modifying the display data.

In some implementations, the process 800 may represent a computer-implemented method that includes enabling network communication to be established with a plurality of users accessing a virtual reality environment. Each user may be associated with a head mounted display device and at least one computing device. For example, a user 502 may be accessing a VR space 500A using an HMD device (e.g., device 504) while being associated with a mobile device 506.

In some implementations, the process 800 may include tracking movements performed in a physical environment by at least one user providing input into the VR space. In some implementations, the tracking movements may be associated with at least one of the users and a respective computing device. For example, the tracking system 212 may track user 502 providing input into VR space 500A. In this example, the input may include motions for entering a personal identification number into an application in the VR space. The personal identification number may be input in the VR space 500A and can be tracked as gesture input. In some implementations, the movements performed in the physical environment may include at least one gesture performed by at least one user, which can function to provide input to the VR space.

In some implementations, tracking the movements performed in the physical space may include tracking the hands, fingers, or other body parts of at least one user within the VR space or at an associated computing device (e.g., the mobile computing device 506). In some implementations, the input corresponds to content displayable in the VR space. The content may be associated with a user's respective computing device and such content may be configured, by the at least one user, as private data.

In some implementations, the process 800 may include altering display data associated with the input, in response to determining that the input is private. In such an example, determining that the input is private may include accessing, for at least one user, preconfigured privacy settings. In some implementations, altering display data associated with the input includes scrambling hand motions associated with the at least one gesture.

In some implementations, the process 800 may include providing, in the VR space, the altered display data to users other than the user providing the input while displaying unmodified (e.g., unaltered) display data to the user providing the input. This can ensure that the user providing the input is provided full view of inputs and content while blocking or obfuscating views for other users in the same VR space. In some implementations, altering particular display data may obfuscate particular virtual content entered or selected by the user. The alteration may include hiding the display data, scrambling the display data, and modifying the display data.

In some implementations, the input is associated with text input provided by a user at a computing device associated with the user. For example, the input may pertain to public or private input (e.g., menu selection, PIN number entry, etc.) provided by user 502 into computing device 504 or gestured text input provided into VR space 500A.

In some implementations, the input may be associated with an audio input provided, in the VR space by a user. If the input is determined to be private, the process 800 may alter such audio data provided to users other than the user entering the audio input. Altering the audio data may include muting the audio input associated with the user entering input until determining that the audio input is no longer private. In another example, altering the audio data may include muting the input while blurring or modifying the mouth of the user providing the audio input.

In some implementations, the method 800 may also include modifying (e.g., altering) the input and displaying, in the VR space, the modified (e.g., altered) input to users other than the at least one user. The modification (e.g., alteration) may include any combination of hiding the input, scrambling the input, changing the input, muting the input, hiding display data associated with the input, hiding an information exchange mechanism associated with the input in the VR space, or modifying an information exchange mechanism associated with the input in the VR space.

In some implementations, the process 800 may include determining that at least one user is providing input associated with a respective mobile computing device. For example, the orientation module 230 can detect movements and input using tracking hardware and software associated with the mobile computing device 506.

Figure 9:
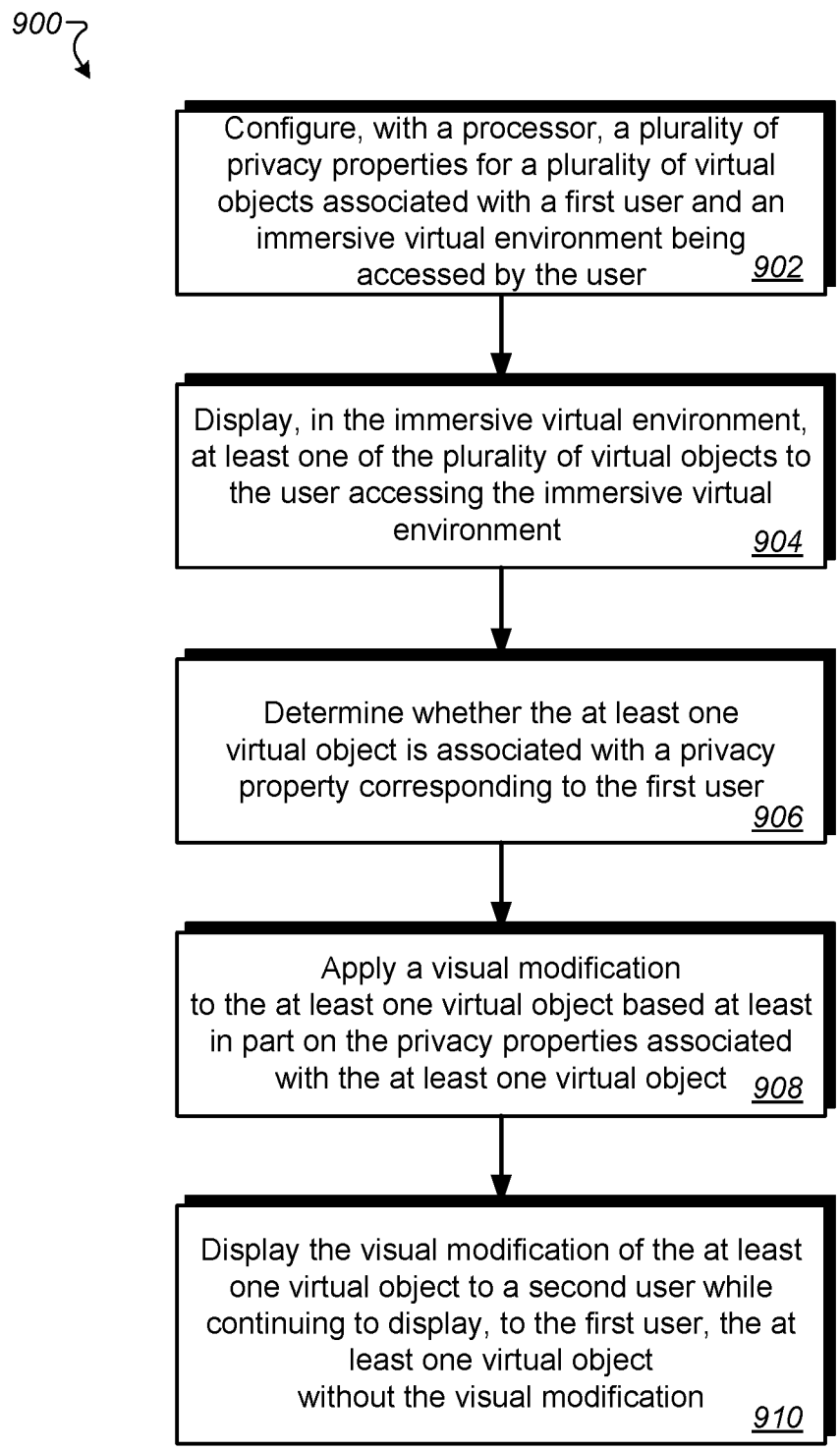
FIG. 9 is a flow chart diagramming one embodiment of a process to maintain system level information privacy.

FIG. 9 is a flow chart diagramming one embodiment of a process 900 to maintain system level information and input privacy. At block 902, the process 900 may represent a computer-implemented method that includes configuring, with a processor, a number of privacy settings for virtual objects associated with a user and a virtual environment (e.g., VR space) being accessed by a device associated with the first user. For example, the virtual environment may be accessed by a user using a computing device such as a controller, or a mobile device (e.g., a smartphone, a tablet, a joystick, or other portable controller(s)) that may be paired with, or communicate with, HMD device 104, for example, for interaction in the VR space. The privacy settings can include, but are not limited to properties associated with data and metadata captured during input and output activities that the user performs or triggers in the VR space. The privacy settings can be assigned to users and/or virtual objects and can function as a basis to manually or automatically select a privacy mode for the user and/or virtual objects.

At block 904, the process 900 may include displaying, in the VR space, at least one virtual object to the user accessing the VR space. For example, the VR system 210 can display content to a user in of HMD device 208 upon request to view content. Although at least one virtual object is described herein, the process 900 can apply to any number of virtual objects associated with a particular VR space, VR session, or user.

At block 906, the process 900 may include determining whether the displayed virtual object is associated with a privacy property corresponding to the first user. For example, the privacy engine 216 can determine whether a system privacy setting or a user-configured privacy setting is defined for the virtual object. The privacy setting can be analyzed and additional content can be displayed in the VR space or removed from display based on the detected privacy setting or lack thereof.

If the process 900 determines that the virtual object is associated with a privacy property corresponding to the first user, at block 908, then the process 900 can determine whether additional users are accessing the VR space. If additional users (e.g., a second user) are accessing the VR space, the process 900 can apply a visual modification to the virtual object based at least in part on the privacy properties associated with the virtual object. The visual modification may apply to a portion of the at least one virtual object. For example, the modification to the display of the virtual object for a second user (e.g., additional users or users other than the user) may include removing a portion of the virtual object, removing content associated with the portion, scrambling (e.g., randomizing) pixels and motions associated with the portion, modifying display of movements as other users see the movements associated with the portion, muting audio associated with the portion, blurring users or content associated with the portion, and/or translating movements associated with the portion to indicate other movements.

At block 910, the process 900 may include displaying, VR space, the visual modification of the virtual object to a second user (e.g., users other than the first user) while continuing to display, to the first user, the virtual object without the visual modification. For example, the privacy engine 216 can determine that particular content or portions corresponding to the virtual object are private and can accordingly modify the display for any users except the user identified as using or interacting with the virtual object. This may ensure that the user that is using or interacting with the virtual object can upload, download, select, gesture, or otherwise provide input with respect to the virtual object and other users cannot be privy to the input because the input may be obfuscated, hidden, or otherwise modified to protect the privacy of the user.

In some implementations, the process 900 may also include displaying, on the virtual object, an icon in which to select a privacy mode. In particular, the process 900 can include receiving, from the user, a selection on the icon. For example, the icon 520 (FIG. 5) can be selected to cause content in VR space 500A to become public. Similarly, icon 514 can cause content in VR space 500A to become private. If the user selects icon 514 to make content, objects, and/or VR space portions private, the process 900 can remove the virtual object from display to users other than the user. (e.g., if the selection pertains to selecting the icon to trigger a private privacy mode). The process 900 may also include revealing the virtual object in the VR space 500A, for example, to at least a portion of users accessing the VR space, if the selection selects a public privacy mode.

In some implementations, the process 900 may include determining, for the user, a context of use for at least one of the virtual objects in the VR space. For example, the privacy engine 216 may determine that a user 416 (FIG. 4) is about to enter a message received in a private messaging application. The VR system 210 can display, in the VR space, the virtual object (e.g., messaging application) to the user. If the system 210 determines that other users are accessing the same VR space, the privacy engine 216 can engage and apply a visual modification to the virtual object (e.g., messaging application) based at least in part on the context of use associated with the at least one application. In particular, the system level settings may specify that any messaging application that is not associated with a game or application engaged in other activities may be deemed private until the user (e.g., owner) says otherwise. In operation, the icon 426D may be switched from public to private upon detection of opening of the messaging application. The process 900 can display the visual modification of the virtual object (e.g., messaging application) to users other than the first user until determining that the context of use is a public use associated with the at least one virtual object. For example, if the user closed the message, the visual modification can be removed and the content associated with the VR space for user 416 can again be displayed to any user configured to receive such content.

In some implementations, the process 900 includes detecting an input associated with at least one virtual object (e.g., personal identification number (PIN) pad in FIG. 7). The input may be textual, audial, gesture-based, etc. For example, user 702 may audibly indicate in the VR space that she wishes to retrieve cash, as shown in FIG. 7. The process 900 can determine that the audio input is associated with data corresponding to the PIN pad and can determine that such data may also be associated with one or more privacy settings. The determination can be based on the audio speech including a sensitive word (e.g., cash) or the PIN pad may automatically trigger privacy modes. The process 900 may include determining that the user is entering additional input corresponding to the virtual object. For example, the privacy engine 216 may detect that the user 702 begins to enter a password on the PIN pad. In response to determining that the additional input includes personal data (e.g., the password, username, etc.), the process 900 can change the privacy setting associated with the virtual object from public view to private view. Changing a privacy setting associated with the virtual object from public to private may include modifying, for users of the VR space other than the user, a view of the virtual object (e.g., PIN pad) including the input, the personal data, and the additional input. In some implementations, modifying the view of the at least one virtual object includes scrambling the input when displaying the input and the at least one virtual object to users of the VR space, other than the user associated with the input.

In some implementations, the process 900 may include determining that the input includes a particular first gesture, performed by a first user. For example, the first gesture may include holding a computing device with a display screen facing the first user. The process 900 can determine that the additional input includes a second gesture, performed by the first user. The second gesture may include holding the computing device facing away from the first user so as to indicate screen content is available for viewing by the second user. The process 900 may then change a privacy setting associated with the computing device from private to public in response to detecting the second gesture. The method can then display the screen content, in the virtual environment, to the second user accessing the virtual environment.

Figure 10:
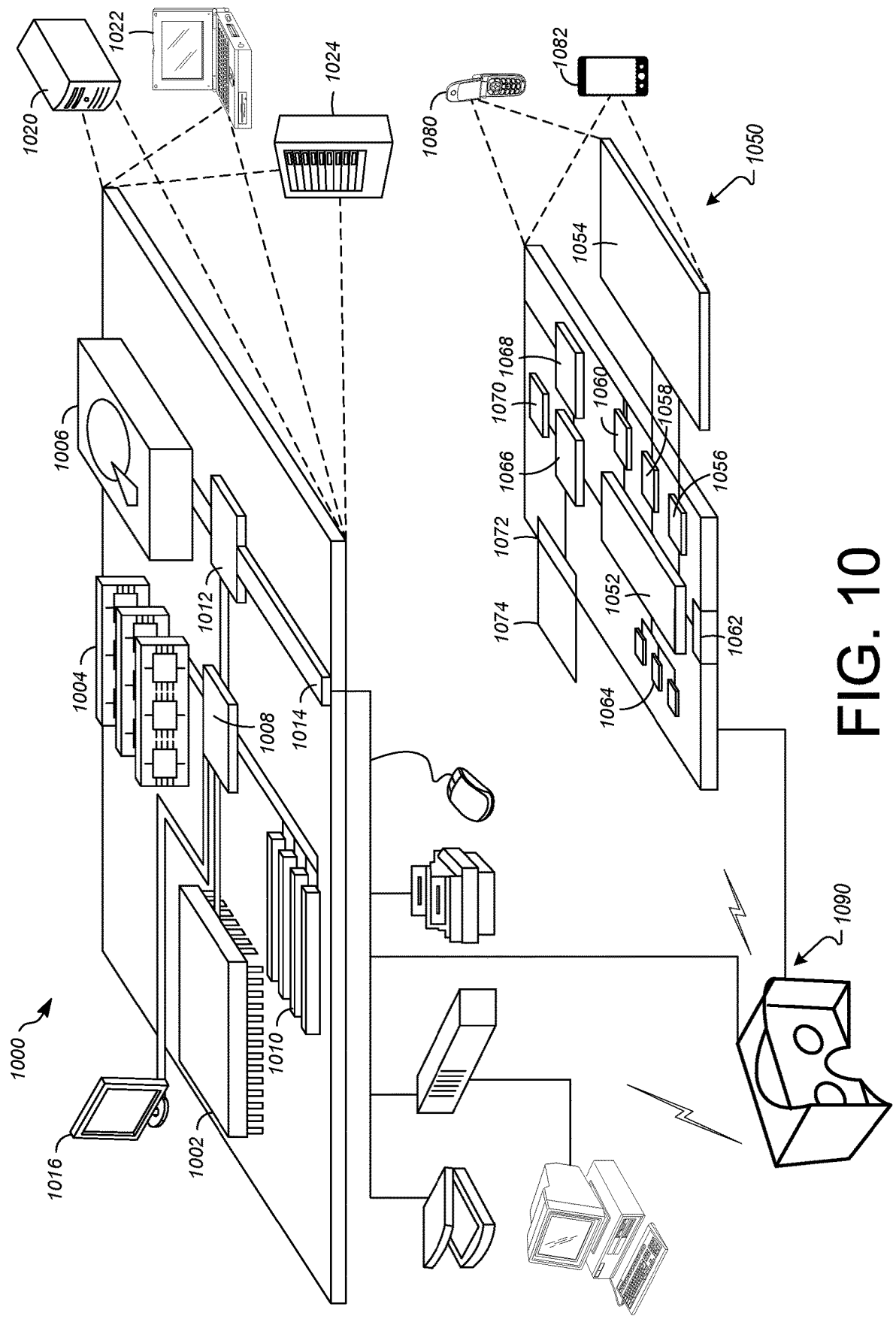
FIG. 10 illustrates an example of a computer device and a mobile computer device that can be used to implement the techniques described herein.

FIG. 10 shows an example of an example computer device 1000 and an example mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. In addition, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1090.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
configuring, with a processor, a plurality of privacy properties for a plurality of virtual objects associated with a first user accessing a virtual reality environment using a device associated with the first user;
triggering for display, in the virtual reality environment, at least one of the plurality of virtual objects to the first user accessing the virtual reality environment;
in response to determining that at least one of a plurality of additional users accessing the virtual reality environment is attempting to access the at least one virtual object:
applying a visual modification to the at least one virtual object based at least in part on a privacy setting associated with the at least one virtual object, and
triggering for display, in the virtual reality environment, the visual modification of the at least one virtual object to the at least one of the plurality of additional users while continuing to trigger display, to the first user, the at least one virtual object without the visual modification.

2. The method of claim 1, wherein the visual modification applies to a portion of the at least one virtual object, the modification including modifying display of the at least one virtual object for the at least one of the plurality of additional users by randomizing pixels depicting motions associated with the portion.

3. The method of claim 1, further comprising:
triggering for display, on the at least one virtual object, an icon in which to select a privacy mode;
receiving, from the first user, a selection on the icon;
triggering hiding of the at least one virtual object from display to users other than the first user, if the selection represents a private privacy mode; and
triggering revealing of the at least one virtual object in the virtual reality environment if the selection represents a public privacy mode.

4. The method of claim 1, further comprising:
determining, for the first user, a context of use for at least one of the plurality of virtual objects in the virtual reality environment, wherein the visual modification is triggered for display to the at least one of the plurality of additional users based at least in part on the determined context of use until detecting that the context of use is a public use associated with the at least one virtual object.

5. The method of claim 1, further comprising:
detecting an input associated with the at least one virtual object;
determining that the input is associated with data corresponding to the at least one virtual object and a privacy setting associated with the user; and
changing the privacy setting associated with the at least one virtual object from private to public in response to determining that the input is unrelated to personal data corresponding to the privacy setting associated with the user.

6. The method of claim 5, wherein changing the privacy setting associated with the at least one virtual object from private to public includes modifying for the at least one of the plurality of additional users accessing the virtual reality environment, view of the at least one virtual object including triggering display of the input.

7. The method of claim 6, wherein the privacy setting associated with the at least one virtual object is changed from public to private upon detecting other input associated with the personal data corresponding to the first user, and the other input is hidden from the at least one of the plurality of additional users accessing the virtual reality environment while the other input is revealed to the first user.

8. The method of claim 5, further comprising:
determining that the input includes a first gesture, performed by the first user, the first gesture including holding a computing device with a display screen facing the first user;
detecting a second gesture, performed by the first user, the second gesture including holding the computing device facing away from the first user so as to indicate screen content is available for viewing by the at least one of the plurality of additional users accessing the virtual reality environment; and
in response to detecting the second gesture, changing a privacy setting associated with the computing device from private to public and displaying the screen content, in the virtual reality environment, to the at least one of the plurality of additional users accessing the virtual reality environment.

9. A non-transitory computer readable medium containing instructions that, when executed by a processor of a computer system, cause the computer system to:
configure, with the processor, a plurality of privacy properties for a plurality of virtual objects associated with a first user accessing a virtual reality environment using a device associated with the first user;
trigger for display, in the virtual reality environment, at least one of the plurality of virtual objects to the first user accessing the virtual reality environment;
in response to determining that at least one of a plurality of additional users accessing the virtual reality environment is attempting to access the at least one virtual object:
applying a visual modification to the at least one virtual object based at least in part on a privacy setting associated with the at least one virtual object, and
triggering for display, in the virtual reality environment, the visual modification of the at least one virtual object to the at least one of the plurality of additional users while continuing to trigger display, to the first user, the at least one virtual object without the visual modification.

10. The computer readable medium of claim 9, wherein the visual modification applies to a portion of the at least one virtual object, the modification including modifying display of the at least one virtual object for the at least one of the plurality of additional users by randomizing pixels depicting motions associated with the portion.

11. The computer readable medium of claim 9, wherein the instructions further cause the computer system to:
trigger for display, on the at least one virtual object, an icon in which to select a privacy mode;
receive, from the first user, a selection on the icon;
trigger hiding of the at least one virtual object from display to users other than the first user, if the selection represents a private privacy mode; and
trigger revealing of the at least one virtual object in the virtual reality environment if the selection represents a public privacy mode.

12. The computer readable medium of claim 9, wherein the instructions further cause the computer system to:
determine, for the first user, a context of use for at least one of the plurality of virtual objects in the virtual reality environment, wherein the visual modification is triggered for display to the at least one of the plurality of additional users based at least in part on the determined context of use until detecting that the context of use is a public use associated with the at least one virtual object.

13. The computer readable medium of claim 9, wherein the instructions further cause the computer system to:
detect an input associated with the at least one virtual object;
determine that the input is associated with data corresponding to the at least one virtual object and a privacy setting associated with the user; and
change the privacy setting associated with the at least one virtual object from private to public in response to determining that the input is unrelated to personal data corresponding to the privacy setting associated with the user.

14. A system comprising:
at least one processor; and
a memory comprising instructions which, when executed by the at least one processor, cause the at least one processor to:

configure, with the at least one processor, a plurality of privacy properties for a plurality of virtual objects associated with a first user accessing a virtual reality environment using a device associated with the first user;

trigger for display, in the virtual reality environment, at least one of the plurality of virtual objects to the first user accessing the virtual reality environment;

in response to determining that at least one of a plurality of additional users accessing the virtual reality environment is attempting to access the at least one virtual object:
- applying a visual modification to the at least one virtual object based at least in part on a privacy setting associated with the at least one virtual object, and
- triggering for display, in the virtual reality environment, the visual modification of the at least one virtual object to the at least one of the plurality of additional users while continuing to trigger display, to the first user, the at least one virtual object without the visual modification.

15. The system of claim 14, wherein the visual modification applies to a portion of the at least one virtual object, the modification including modifying display of the at least one virtual object for the at least one of the plurality of additional users by randomizing pixels depicting motions associated with the portion.

16. The system of claim 14, wherein the instructions, when executed by the at least one processor, further cause the at least one processor to:
trigger for display, on the at least one virtual object, an icon in which to select a privacy mode;
receive, from the first user, a selection on the icon;
trigger hiding of the at least one virtual object from display to users other than the first user, if the selection represents a private privacy mode; and
trigger revealing of the at least one virtual object in the virtual reality environment if the selection represents a public privacy mode.

17. The system of claim 14, wherein the instructions, when executed by the at least one processor, further cause the at least one processor to:
determine, for the first user, a context of use for at least one of the plurality of virtual objects in the virtual reality environment, wherein the visual modification is triggered for display to the at least one of the plurality of additional users based at least in part on the determined context of use until detecting that the context of use is a public use associated with the at least one virtual object.

18. The system of claim 14, wherein the instructions, when executed by the at least one processor, further cause the at least one processor to:
detect an input associated with the at least one virtual object;
determine that the input is associated with data corresponding to the at least one virtual object and a privacy setting associated with the user; and
change the privacy setting associated with the at least one virtual object from private to public in response to determining that the input is unrelated to personal data corresponding to the privacy setting associated with the user.

19. The system of claim 18, wherein changing the privacy setting associated with the at least one virtual object from private to public includes modifying a view of the at least one virtual object including triggering display of the input.

20. The system of claim 18, wherein the instructions, when executed by the at least one processor, further cause the at least one processor to:
determine that the input includes a first gesture, performed by the first user, the first gesture including holding a computing device with a display screen facing the first user;
detecting a second gesture, performed by the first user, the second gesture including holding the computing device facing away from the first user so as to indicate screen content is available for viewing by the at least one of the plurality of additional users accessing the virtual reality environment; and
in response to detecting the second gesture, changing a privacy setting associated with the computing device from private to public and displaying the screen content, in the virtual reality environment, to the at least one of the plurality of additional users accessing the virtual reality environment.

* * * * *